US008137785B2

(12) United States Patent
Yamaguchi

(10) Patent No.: US 8,137,785 B2
(45) Date of Patent: Mar. 20, 2012

(54) HONEYCOMB STRUCTURE

(75) Inventor: Shinji Yamaguchi, Aichi-prefecture (JP)

(73) Assignee: NGK Insulators, Ltd., Nagoya (JP)

( * ) Notice: Subject to any disclaimer, the term of this patent is extended or adjusted under 35 U.S.C. 154(b) by 263 days.

(21) Appl. No.: 12/405,682

(22) Filed: Mar. 17, 2009

(65) Prior Publication Data

US 2009/0239029 A1 Sep. 24, 2009

(30) Foreign Application Priority Data

Mar. 21, 2008 (JP) ................. 2008-072899

(51) Int. Cl.
B32B 3/12 (2006.01)
B01D 39/06 (2006.01)
B01D 45/00 (2006.01)
B01D 45/12 (2006.01)

(52) U.S. Cl. .............. 428/116; 502/527.18; 55/523; 55/342; 55/348

(58) Field of Classification Search .......... None
See application file for complete search history.

(56) References Cited

U.S. PATENT DOCUMENTS 3,982,100 A * 9/1976 Hervert ............... 219/553
4,979,364 A * 12/1990 Fleck ................. 60/274
5,458,673 A * 10/1995 Kojima et al. ............ 95/11
2005/0160710 A1 * 7/2005 Taoka et al. ............. 55/523

FOREIGN PATENT DOCUMENTS

JP B2-3999089 10/2007

* cited by examiner

Primary Examiner — Gordon R Baldwin
(74) Attorney, Agent, or Firm — Oliff & Berridge, PLC

(57) ABSTRACT

Provided is a honeycomb structure that is divided by a porous partition wall 3, as well as that is formed of a plurality of cells 5 acting as a through channel of a fluid. An insertion hole 9 in which a sensor can be inserted is formed in an end face of the honeycomb structure, and a breakage prevention means 17 is provided on an inner circumference or in the proximity of the insertion hole. According to this honeycomb structure, it is possible to provide a honeycomb structure or a honeycomb filter in which a temperature, an oxygen concentration and the like of the honeycomb structure can be directly measured; a temperature control of the honeycomb structure, being a base member can be easily made, and various sensors in accordance with applications of OBD measurement, measurement of an oxygen concentration, an $NO_x$ concentration and the like can be attached; and further, canning is easy to be conducted, and the durability of various attached sensors can be improved. Especially in the case of the use in a DPF, the present invention can be preferably used without soot leakage.

17 Claims, 24 Drawing Sheets

FIG.3A
FIG.3B
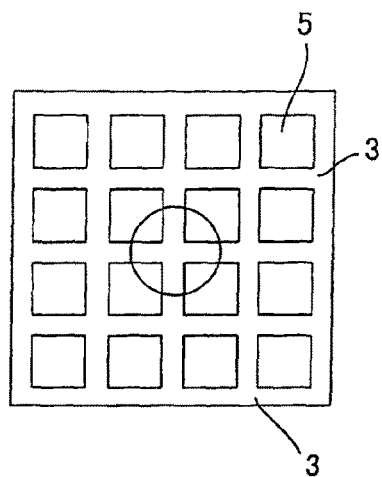
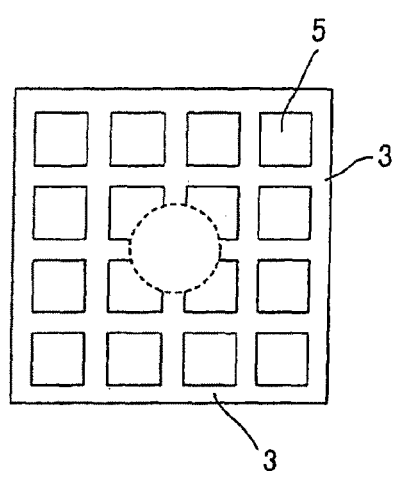
FIG.3C
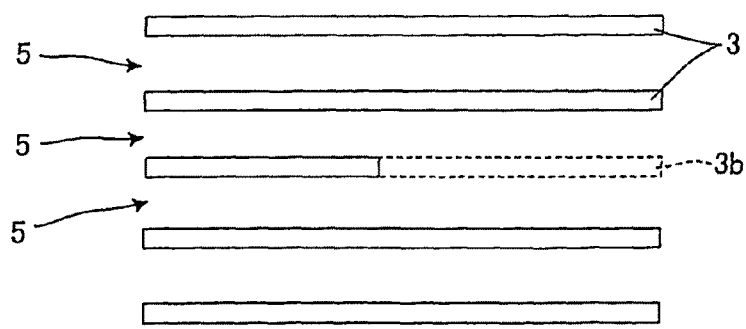

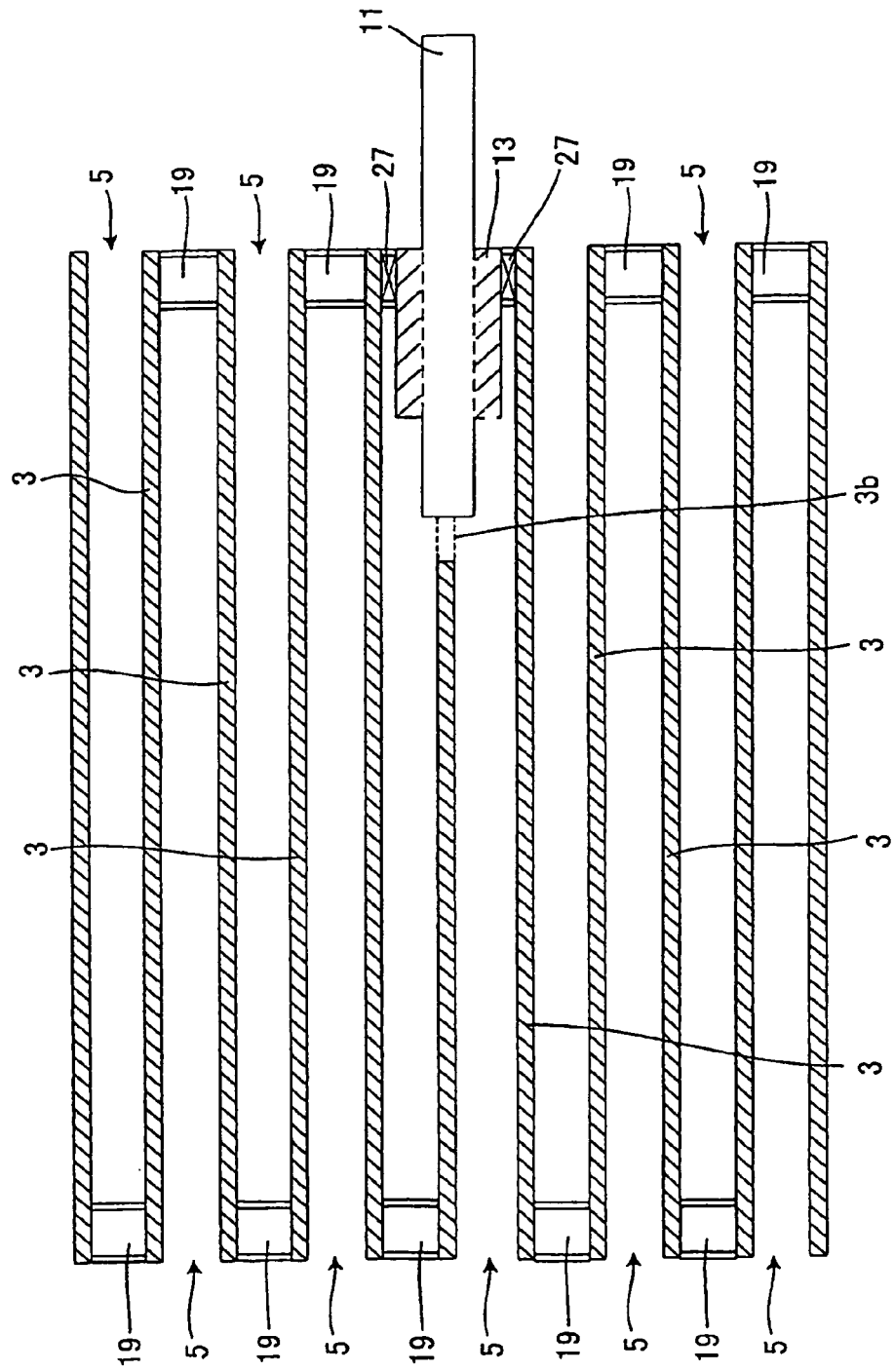

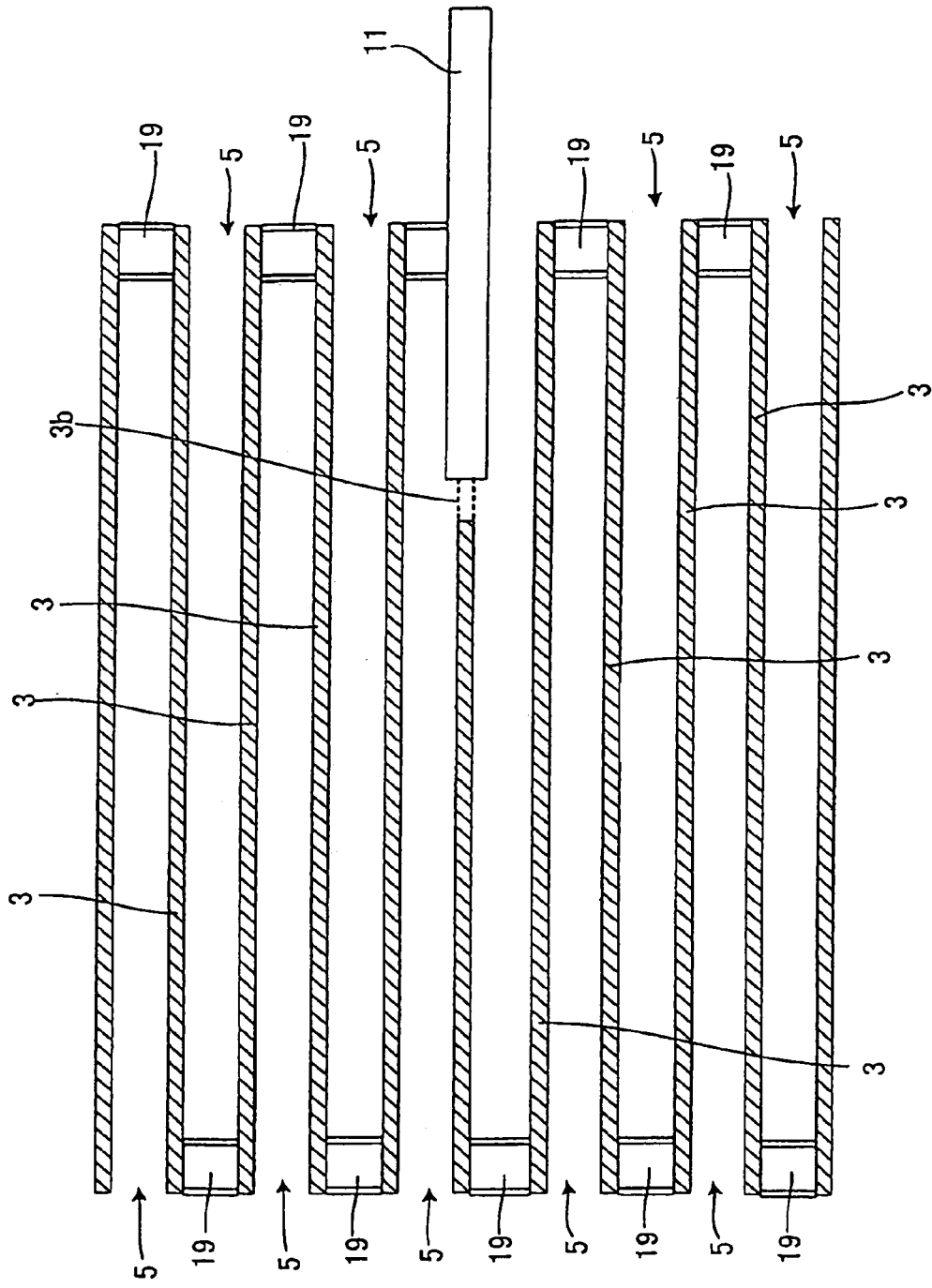

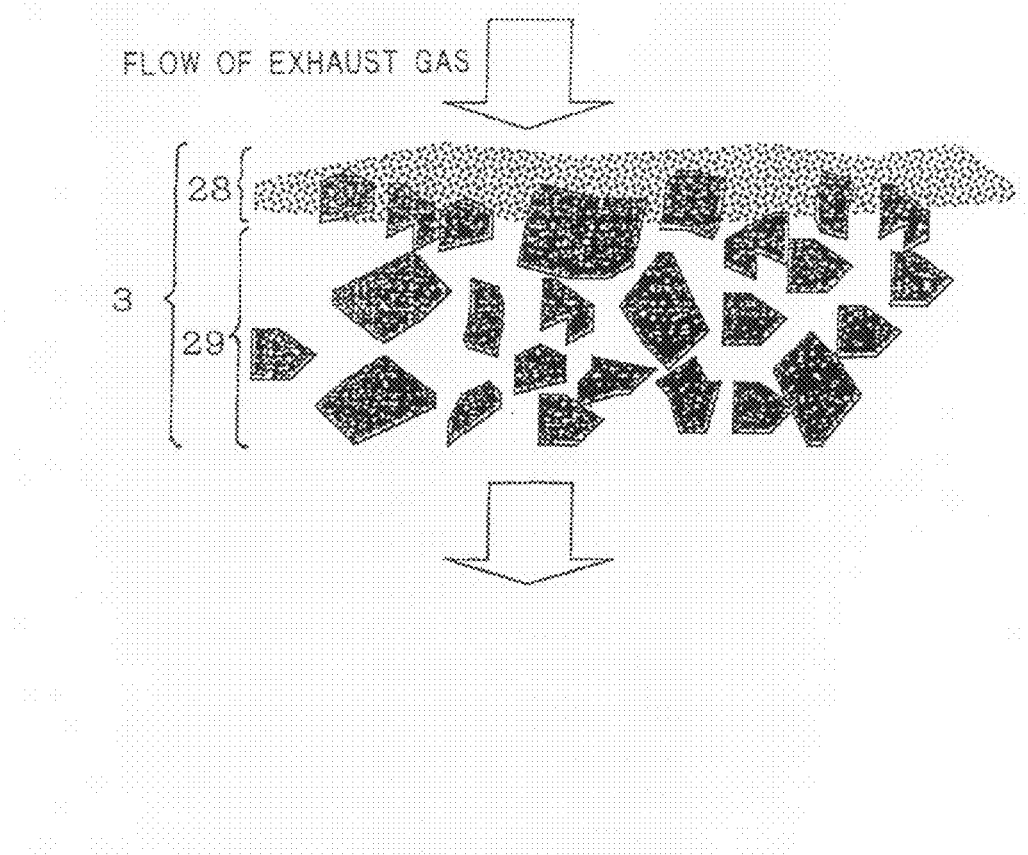

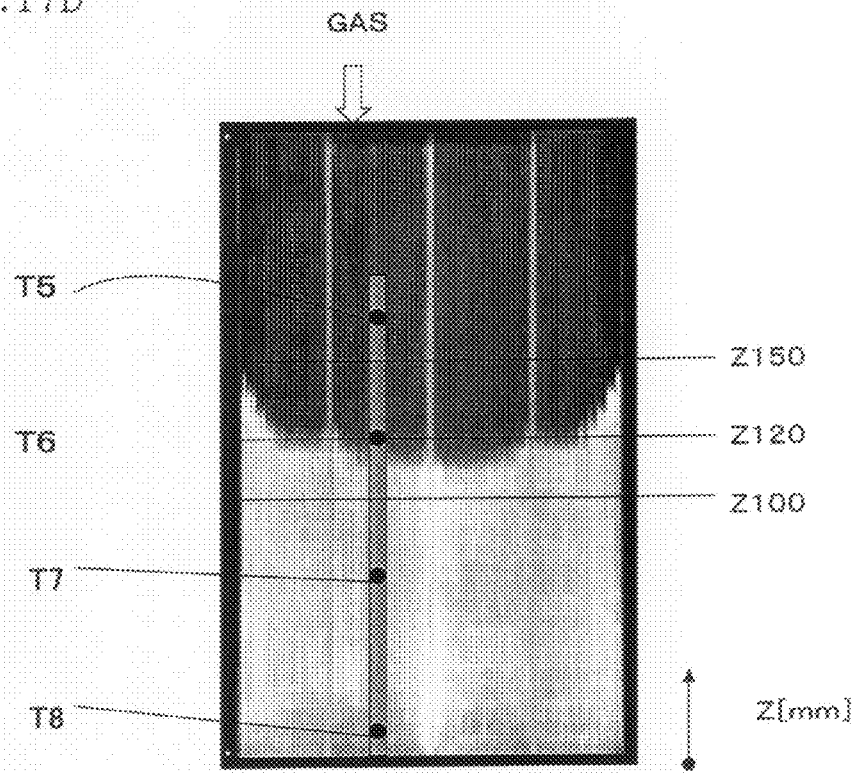

HONEYCOMB STRUCTURE

BACKGROUND OF THE INVENTION AND RELATED ART

The present invention relates to a honeycomb structure with a sensor insertion hole.

RELATED BACKGROUND OF THE INVENTION

In various fields of chemistry, an electric power, iron and steel and the like, as a carrier of a catalyst apparatus or a filter for use in environmental measures, collection of specified substances or the like, employed is a plugged honeycomb structure that is made of ceramics of superior heat resistance and corrosion resistance. In particular, in recent years, the plugged honeycomb structure is used as an exhaust gas catalyst filter, for an engine of an automobile, a truck or a bus, and further for exhaust gas processing of a combustion apparatus. Most of all, this plugged honeycomb structure is often used as a diesel particulate filter (DPF) of collecting a particulate matter (PM) to exhausted from a diesel engine. Furthermore, as the material of a honeycomb structure to be used under an atmosphere of high-temperature and corrosive gas, ceramics materials such as cordierite or silicon carbide (SiC) having superior heat resistance and chemical stability are preferably used.

Such a honeycomb structure has a structure in which a plurality of cells acting as through channels of a fluid that are defined and formed by a porous partition wall that is made of e.g., ceramics are aligned so as to be parallel to each other in the axial direction. In addition, ends of adjacent cells are alternately plugged (in a checkerboard design). That is, one cell is open at one end and plugged at the other end, and the other cell adjacent thereto is plugged at one end and open at the other end. Owing to such structure, an exhaust gas having been allowed to flow in a predetermined cell (inflow cell) from one end portion is made to penetrate a porous partition wall, thereby causing it to flow out through the cell (outflow cell) adjacent to the inflow cell. Further, particulate substances (particulates) in an exhaust gas are collected by the partition wall on the occasion of penetration through the partition wall, and thus the purification of an exhaust gas can be conducted.

In the meanwhile, in an exhaust gas purification apparatus in which the above-described conventional honeycomb structure or honeycomb filter is used, a control or anon board diagnosis (OBD) based on signals of a pressure, a temperature or the like from a sensor that is attached to piping is carried out regularly or as the need arises. In the conventional honeycomb structure, the conventional honeycomb filter or the like, there is no proper means of directly measuring the pressure, the temperature or the like of e.g., the honeycomb filter, and using a differential pressure gauge or a temperature sensor that is attached to the piping in the front or at the rear of the honeycomb filter, a pressure drop and a temperature are measured, thus to indirectly determine the presence or absence of error from the rate of its change. Furthermore, in the honeycomb structure without plugging, it is proposed that a hole is formed in the honeycomb side face, a thermocouple of a temperature sensor is inserted in this hole, and thus a temperature is measured. However, in this case, a filter portion having a plugging part cannot be directly measured and its measurement is just an indirect measurement, so that an accurate measurement of numerical values is not made, and thus the presence or the absence of defects is unlikely to be determined. In addition, in the case of forming a hole in the side face, damages will be applied to the honeycomb. That is, the thickness of the cell partition wall of the honeycomb is small and to form an insertion hole for inserting a sensor, cutting using e.g., a drill needs to be made, and there is a high possibility of applying the damage to the cell partition wall to break it in this cutting process. Therefore, characteristics of the honeycomb are impaired to a large extent. Furthermore, even if there is applied no damage in the process of forming an insertion hole, in the conventional honeycomb structure or honeycomb filter, it is likely to apply damages at the time of inserting a temperature sensor, and as is described above, characteristics of the honeycomb structure or the honeycomb filter are impaired much.

Furthermore, in the DPF of letting the conventional honeycomb structure a base member, in the case in which a hole for attaching a sensor is formed in its side face and the sensor is inserted in this hole, even if a seal member is mounted between a sensor and a filter case, there is produced a space between the sensor and the hole of the filter base member, and thus a problem exists in that soot is leaked from this space.

In addition, in the case of inserting a sensor in the honeycomb from side, a serious problem arises in the manufacturing process. For example, in the case of forming a hole in the honeycomb side face, on the occasion of canning, it is not easy that respective holes of a canning, a mat and a honeycomb are aligned. When the hole of the mat is made larger or the mat in a circumferential direction is missed, a problem arises in that due to non-uniform mat surface pressure, the stress applied to the honeycomb comes to increase and that due to non-uniform heat transmission, a temperature distribution becomes worse and a thermal stress comes to increase. Particularly, in the filter, a high thermal stress is likely to be generated at the time of soot regeneration, to be prone to be problematic. However, when after the process of making one unit of the canning, the mat and the honeycomb has been preceded, a hole is formed using a drilling tool such as a drill, damages are more likely to be applied to the honeycomb. With the arrangement, also in the manufacturing process, problems are likely to occur.

Against such problems, although a sensor is attempted to be disposed so as to be contained in one of a plurality of cells that are provided at the conventional honeycomb structure, the cell is generally of smaller dimensions as compared to a temperature sensor to be installed, and thus the sensor cannot be inserted without the application of damages to the honeycomb. Even if a sensor of a very small line diameter is used, by a thermal history during being mounted on a vehicle, this sensor cannot be resistant thereto. Further, since it is a special sensor, it is problematic in respect of costs such as development costs or commercial profits, to be actually hard to be manufactured.

Furthermore, to address recent environmental issues, the purification performance (for example, an oxygen concentration, an $NO_x$ concentration and the like) using a catalyst of an exhaust gas purification apparatus is required to be accurately measured. Thus, besides a temperature sensor, a variety of measuring sensors such as an oxygen concentration measuring sensor or a $NO_x$ concentration measuring sensor are requested to be attached.

With respect to such various problems, there is the following Patent Document.

In Patent Document 1 (U.S. Pat. No. 3,999,089), it is disclosed that a plugging part on the gas inlet side of a honeycomb filter is disposed in a place shifted rearward from the inlet end face, and a sensor hole is formed in the side face forward of this inlet side plugging. However, since there is formed the sensor hole forward of the plugging part, the temperature in the proximity of the honeycomb filter outlet to be at the highest temperature on the occasion when an accumulated soot is burned cannot be directly measured. Further, since a pre-oxidation catalyst and a honeycomb filter that are mounted in commercially available vehicles now are separate bodies, it is possible to form a hole in the case side face to insert a sensor, and thus it is not difficult to measure the gas temperature at the filter inlet.

SUMMARY OF THE INVENTION

The present invention has been made to solve the above-mentioned problems, has an object of providing a honeycomb structure or a honeycomb filter in which by forming an insertion hole in which a sensor can be inserted in the end face of the honeycomb structure, a temperature, an oxygen concentration and the like of the honeycomb structure can be directly measured; a temperature control of the honeycomb structure, being a base member can be easily made, and various sensors in accordance with applications of OBD measurement, measurement of an oxygen concentration, an $NO_x$ concentration and the like can be attached; and further, canning is easy to be conducted, and the durability of various attached sensors can be improved. Especially in the case of the use in a DPF, the present invention can be preferably used without soot leakage.

According to the present invention, the following honeycomb structure with a sensor insertion hole will be provided.

[1] A honeycomb structure that is divided by a porous partition wall, as well as that is formed of a plurality of cells acting as a through channel of a fluid,
wherein an insertion hole in which a sensor can be inserted is formed in an end face of the honeycomb structure; and
wherein there is provided a breakage prevention means on an inner circumference or in the proximity of the insertion hole.

[2] A honeycomb structure according to [1], wherein the insertion hole is formed in a length direction of the honeycomb structure.

[3] A honeycomb structure according to [1] or [2],
wherein the insertion hole is formed in a region extending over a plurality of cells.

[4] A honeycomb structure according to any one of [1] to [3], wherein the insertion hole is formed on an end face side corresponding to an outlet side of a fluid.

[5] A honeycomb structure according to [4], wherein a wall reinforcing member is further applied or injected as the breakage prevention means.

[6] A honeycomb structure according to [5], wherein the same material as an outer peripheral coat member or a plugging member is further injected as the breakage prevention means.

[7] A honeycomb structure according to any one of [1] to [6], wherein a sleeve is located as the breakage prevention means.

[8] A honeycomb structure according to any one of [5] to [7], further comprising a space of a measurement portion or a low-heat capacity portion in an insertion hole in which the breakage prevention means is provided.

[9] A honeycomb structure according to any one of [1] to [8], wherein a material is ceramic, and its average pore diameter is 1 μm to 20 μm.

[10] A honeycomb structure according to any one of [1] to [9], wherein the partition wall is constructed to be of a multi-layer structure including a porous partition wall base member and at least one layer of a surface layer that is provided only on an inflow side or both on an inflow side and on an outflow side of the fluid at the partition wall base member.

[11] A honeycomb structure according to any one of [1] to [10], wherein in the case providing that the sum total of areas in a cross section perpendicular to a longitudinal direction of the predetermined cells whose one end portion is plugged is A (mm$^2$) and providing that the sum total of areas in a cross section perpendicular to a longitudinal direction of the remaining cells whose other end portion is plugged is B (mm$^2$), they are in a relationship of A<B.

[12] A honeycomb structure according to any one of [1] to [11], wherein it is formed such that a cross sectional shape perpendicular with respect to a longitudinal direction of the predetermined cells whose one end portion is plugged and a cross sectional shape perpendicular with respect to a longitudinal direction of the remaining cells whose other end portion is plugged are different.

[13] A honeycomb structure according to any one of [1] to [12], wherein the sensor can detect a blocked state of the cell.

[14] A honeycomb filter in which at an end face on the opposite side to an end face at which the insertion hole of a honeycomb structure according to any one of [1] to [13] is formed, an inlet or an outlet in the same channel as a cell proximate to an outer circumference of the insertion hole is additionally plugged.

[15] A converter in which a honeycomb filter according to [14] is brought in canning and attached with a sensor.

[16] A method of detecting a blocked amount of detecting the blocked amount of the cell in the honeycomb structure using a honeycomb structure according to any one of [1] to [14].

According to the present invention, provided are such excellent advantages of capable of providing the honeycomb structure in which by forming an insertion hole in which a sensor can be inserted in the end face of the honeycomb structure, a temperature, an oxygen concentration and the like of the honeycomb structure can be directly measured; a temperature control of the honeycomb structure, being a base member can be easily made, and various sensors in accordance with applications of OBD measurement, measurement of an oxygen concentration, an $NO_x$ concentration and the like can be attached; and further, canning is easy to be conducted, and the durability of various attached sensors can be improved. Most of all, provided are excellent advantages that especially in the case of the use in a DPF, the present invention can be preferably used without soot leakage.

BRIEF DESCRIPTION OF THE DRAWINGS

FIG. 3A is a view illustrating the state before the insertion hole that is illustrated in FIG. 1 is formed, and an enlarged view with a part therearound enlarged.

FIG. 3B is a schematic view illustrating a honeycomb structure with a sensor insertion hole to which an embodiment according to the present invention is applied, a view illustrating the state after the insertion hole that is illustrated in FIG. 1 has been formed, and an enlarged view with a part therearound enlarged.

FIG. 3C is a view schematically illustrating the state of FIG. 3B in which the honeycomb structure is cross-sectioned in a length direction with the insertion hole being a reference (center).

FIG. 11C is a schematic view illustrating a part of a honeycomb structure with a sensor insertion hole to which another embodiment according to the present invention is applied, and a view illustrating the cross section of a DPF of Example 3 and the state in which a sensor is attached.

FIG. 12C is a view schematically illustrating the cross section of a part of a DPF of Comparative Example 3 and the state in which a sensor is attached.

FIG. 15 is a partially cross sectional view schematically illustrating in enlarged way a partition wall of a honeycomb structure with a sensor insertion hole to which an embodiment according to the present invention is applied.

FIG. 17D is a photograph illustrating the state in which Ash is accumulated in the DPF of Example 1 and cells are blocked, and illustrating the cross section in the length direction of the DPF.

EXPLANATION OF REFERENCE NUMERALS

Figure 1:
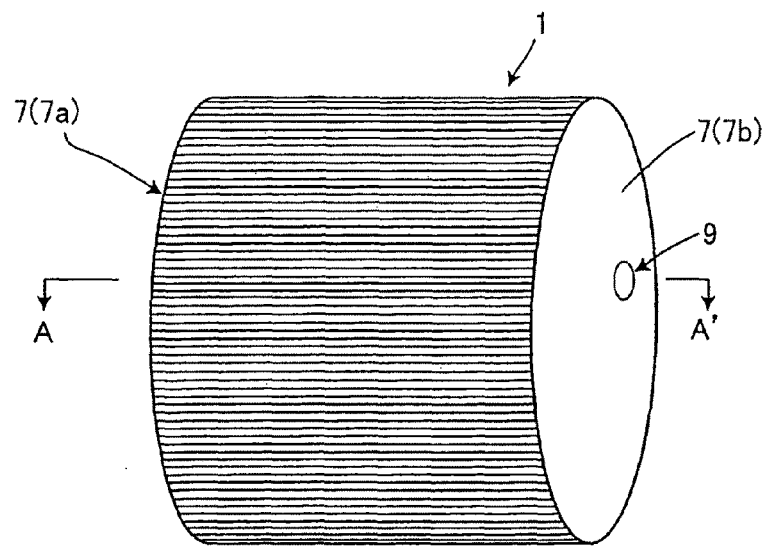
FIG. 1 is a schematic view illustrating a honeycomb structure with a sensor insertion hole to which a preferred embodiment according to the present invention is applied and a front elevation view of a ceramic filter.

1: honeycomb structure, 3: partition wall, 3b: partition wall, 5, 5a, 5b, 5c, 5d, 5e, 5f, 5g, 5h: cell, 5x: quadrilateral cell, 5y: octagonal cell, 7: end face, 9: insertion hole, 11: sensor, 13: sleeve, 15: sleeve insertion hole, 16: breakage prevention means, 17: reinforcing member, 19: plugging, 21, 21a, 21b: additional plugging, 23: mat, 25: thermocouple, 27: outer peripheral coat member, 28: surface layer (coat layer), 29: partition wall base member, 33a, 33b: leaf spring, 37: reinforcing part, 37a: reinforcing part hole, P: measurement point, G: exhaust gas

DESCRIPTION OF THE PREFERRED EMBODIMENTS

Hereinafter, an embodiment for carrying out a honeycomb structure according to the present invention will be specifically described. The present invention, however, widely includes a honeycomb structure with a sensor insertion hole having its features of the invention, and is not limited to the following embodiments.

[1] Honeycomb Structure According to the Present Invention

A honeycomb structure 1 according to the present invention, as is illustrated in FIGS. 1 to 4B, is a honeycomb structure that is divided by a porous partition wall 3, as well as that is formed of a plurality of cells 5 acting as through channels of a fluid. There is formed in an end face 7 of the honeycomb structure 1 an insertion hole 9 in which a sensor can be inserted, and a breakage prevention means 16 is provided on the inner circumference or in the proximity of the insertion hole 9.

Figure 2A:
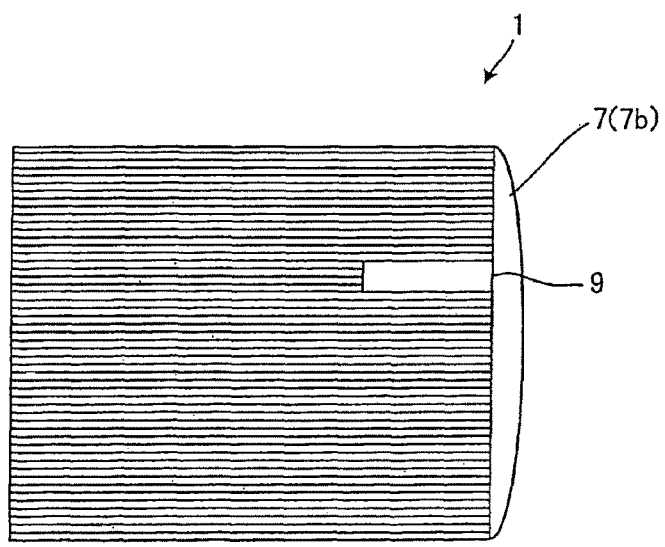
FIG. 2A is a schematic view illustrating a honeycomb structure with a sensor insertion hole to which an embodiment according to the present invention is applied, a cross sectional view taken along the line A-A' illustrated in FIG. 1, and a view with a part omitted.
Figure 2B:
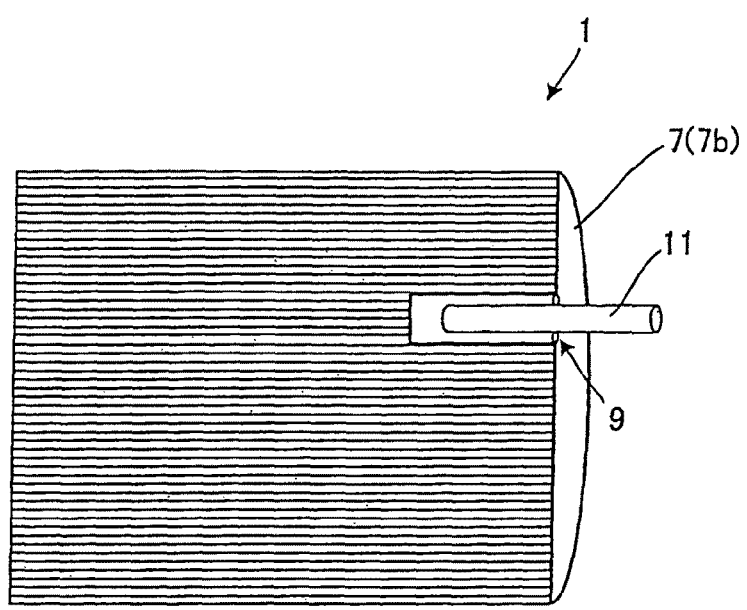
FIG. 2B is a view schematically illustrating the state in which a sensor is inserted in the honeycomb structure with a sensor insertion hole of FIG. 2A.

[1-1] Insertion Hole:

An insertion hole provided in this embodiment, as is illustrated in FIGS. 1 and 2A, is formed in an end face 7 (7b) of a honeycomb structure, and further as is illustrated in FIG. 2B, formed so that a sensor 11 can be inserted therein. The reason why such construction is employed is to be able to directly measure a temperature, an oxygen concentration and the like in an internal part of the honeycomb structure without provision of damages to the honeycomb structure. Furthermore, the trouble of forming the space of mounting a sensor does not have to take after canning. In addition, although at the time of attachment or detachment of a sensor, the sensor to be attached is also likely to be contacted with the partition wall of the honeycomb and damaged, the formation of an insertion hole can improve durability of the sensor.

The shape of an insertion hole may be, for example, circular, elliptical or triangular, but it is not limited to these shapes and can select preferred shapes in accordance with the shape of the desired sensor intended to be attached.

In specific, as illustrated in FIG. 3A, in the case of forming an insertion hole in a region surrounded by a circle (○), when the partition wall 3 resided in the region surrounded by this circle is cut using a tool such as a drill, the insertion hole 9 in which a sensor can be inserted as is illustrated in FIGS. 3B and 3C can be formed. Incidentally, the partition wall indicated by a dotted line of FIG. 3C illustrates the partition wall 3b having been cut off.

The dimension of an insertion hole is preferably of such a size that various sensors can be inserted. For example, the dimension of a general sensor is about 0.1 mm to 20 mm, but it is not limited to these sizes. To be able to use sensors of preferred dimensions as is necessary, the dimension of a hole is desired to be properly selected as the need arises. For example, in the case of a thermocouple for temperature measurement, a sheath type is used, and as a commercially available size, sizes of diameter $\phi 0.5$, $\phi 1.0$, $\phi 1.6$, $\phi 2.3$, $\phi 3.2$, $\phi 4.8$, $\phi 6.4$, $\phi 8.0$ mm and the like are general. In addition, as other thermocouples for temperature measurement other than those of the above-described sizes, there are the so-called extra fine types of diameter $\phi 0.15$ mm, $\phi 0.25$ mm and the like. Such extra fine types can be used for measurement at the portion at comparatively low temperature where no durability is required. Since, however, a small wire diameter results in low strength, a reinforcing part is required for mounting. Further, there are some cases in which a set of plural thermocouples is used. As a further variation, in some cases, to prevent dislodgement, a part of the sensor is formed to be screw-shaped or formed with an engaging part such as depressions and projections. For example, in the case of a screw shape, the size of M4 or M5 can be used. Although there are various sizes or variations of thermocouples as is described above, in general, higher durability is advantageously obtained as the diameter of a thermocouple is increased; and superior responsibility can be obtained as it is decreased.

An insertion hole of the same dimension as the dimension of a sensor to be inserted is not desired because on the occasion of inserting the sensor in this insertion hole, damages are applied to both the honeycomb structure and the sensor. Furthermore, the insertion hole excessively larger than the dimension of the sensor is not desired because the sensor is likely to be dislodged. Thus, the diameter of the hole, in respect of responsibility and durability, is preferably about diameter $\phi 0.2$ mm to $\phi 21$ mm, more preferably diameter $\phi 1.7$ mm to $\phi 5.0$ mm. The depth of the hole from the outlet side end face is preferably about 10 mm to 100 mm because measurement of the portion at the highest temperature can be conducted.

As the method of forming an insertion hole, it is desired to be formed using a drilling tool such as a drill before firing of a honeycomb structure (the so-called raw honeycomb structure). This reason is that when in a honeycomb structure obtainable after firing, a drilling tool such as a drill is used on the occasion of forming an insertion hole, a cell or a partition wall will be crushed, and there is a possibility to apply damages to the honeycomb before sensor insertion. On the other hand, in the case of applying the below-described reinforcing member or in the case of mounting a sleeve, in the honeycomb structure obtainable after firing, an insertion hole can be formed using e.g., a machining center equipped with a diamond grindstone. This reason is that by applying a reinforcing member or mounting a sleeve after the formation of a hole, influences of damage can be actually eliminated. In addition, processing of dislodgement prevention such as depressions and projections can be made after the reinforcing member has been applied as well.

An insertion hole is preferably formed in the length direction of a honeycomb structure. The insertion hole is formed in the length direction of the honeycomb structure that is in a through channel direction of a cell, thereby enabling the amount of cells to be drilled to be as small as possible due to the formation of the insertion hole and thus enabling to suppress the degradation of characteristics of a honeycomb to a minimum. In other words, as the drilled area of an insertion hole in the cross section of the honeycomb structure is increased, a larger stress at the time of drilling is applied to the partition walls of defining (dividing into) cells. As a result, characteristics of a honeycomb structure that can be obtained are likely to be impaired. Consequently, to prevent such harmful influences, by forming the insertion hole in the length direction of the honeycomb structure, the amount of cells to be applied with the stress at the time of drilling is made as small as possible.

Furthermore, the formation of an insertion hole is desired because influences exerted on the inflow or the outflow of a fluid is reduced to a minimum, and even if a sensor is inserted (put in), substantially the same flow of a fluid as that in the state in which no sensor is inserted can be kept to enable an exact measurement. When measuring the temperature, the oxygen concentration, the $NO_x$ concentration and the like in an internal part of the honeycomb structure using a sensor, if there would be different measurement conditions such as the inflow, direction and velocity of a fluid between the case of insertion of a sensor and the case of no insertion of a sensor, it is not to properly measure the state of a honeycomb. Thus, to be able to make measurements in the state immensely similar to that of no sensor, the formation position of an insertion hole is formed in the desired position.

Further, the insertion hole is preferably formed in a region extending over a plurality of cells. This reason is that the insertion hole is easily formed. Here, the formation in the region extending over a plurality of cells means the formation over a plurality of adjacent cells so as to straddle a plurality of adjacent cells and the partition walls of division into cells. As described above, this reason is that the insertion hole is hard to be formed in one cell. However, in formation in the region extending over a plurality of cells as described above, the insertion hole is preferably formed not to be of excessive size or dimension. This reason is that the formation of an insertion hole of excessive size or dimension results in impaired characteristics of a honeycomb.

In addition, the insertion hole is preferably formed in either of both end faces of a honeycomb structure, and more preferably formed on the end face side corresponding to the outlet side of a fluid. The end face of the honeycomb structure is to be an inflow channel or an outflow channel of a fluid. The case of forming a sensor insertion hole in the inflow channel of the honeycomb structure is desired, for example, since the fluid to flow in is affected by the heat capacity of a honeycomb part, and thus the state in the vicinity of the inlet of the fluid such as the temperature, pressure and concentration of the fluid can be directly measured. This case is desired since e.g., the inflow of the fluid can be measured and thus it can be measured e.g., how the stress of the fluid is loaded by the honeycomb structure. Furthermore, in the case of forming a sensor insertion hole in the outflow channel of the honeycomb structure, for example, since the temperature in the honeycomb structure is increased much, its measurement has a large significance for preventing melting. Further, also as to the oxygen concentration or the $NO_x$ concentration, since deteriorations or faults of purification performance can be found, their measurements have a large significance as well.

Incidentally, the position of forming an insertion hole in an end face is desired to be within ¾ the radius rather than the outside diameter inside from the axis of a honeycomb structure. Further, this position is desired to be 1/10 the radius rather than on axis of the honeycomb structure. In addition, in the case of temperature measurement, this position is desired to be not less than ¼, or outside the inside diameter of a piping. Since they are places where the rise of temperature or melting resulted from this temperature rise are likely to occur, in order to control such harmful influences, the insertion hole is preferably formed to be in the desired place. Furthermore, in respect of attachment of a sensor, the insertion hole is preferably formed rather outside the axis of the honeycomb structure. In the case in which a honeycomb filter is of odd-form shape such as an ellipse, in the case in which a piping is asymmetrical or the like, it is desired that the position in which the temperature is likely to rise most affected by the flow of a gas has preliminarily been measured, and a sensor hole is formed in this position.

[1-2] Breakage Prevention Means:

Breakage prevention means is provided on the inner circumference or in the proximity of the insertion hole. The reason why there is provided in the desired position breakage prevention means as described above is to prevent the occurrence of e.g., chipping to be generated by an external force at the time of mounting a sensor as well as to avoid the risk that when in use, a sensor is vibrated, collided with the internal part of the sensor hole, and applied with damages. In addition, there are effects of making up for the state of reduced strength of actually removed partition walls by drilling as compared to that before drilling. Further, as compared to the state before the formation of the insertion hole, since on the occasion of forming the insertion hole, there is formed a space even if a sensor is inserted, the change of the flow of a fluid by the formation of the insertion hole is prevented to the utmost as well as impaired characteristics of a honeycomb is prevented. In addition, this reason is also to enable to make an accurate measurement in the honeycomb at the time of inserting a sensor. Examples of such breakage prevention means include the following ones.

Here, in the proximity of the insertion hole, there are included not only a positional relationship in an internal part of the honeycomb adjacent to the insertion hole, but also a positional relationship outside the honeycomb in which breakage prevention means is externally attached (for example, the below-described reinforcing part externally attached).

[1-2-1] Wall Reinforcing Member:

Furthermore, as breakage prevention means, further a wall reinforcing member is preferably applied or injected. It is desired because the strength on the inner circumference or in the proximity of the insertion hole can be kept. Further, it is desired to use together with the below-described sleeve because a sensor can be secured detachably in the desired place via the sleeve. Since the sleeve and the wall reinforcing member are interposed between the sensor and the honeycomb, the attachment or detachment of the sensor exerts no damages to the honeycomb.

Figure 4A:
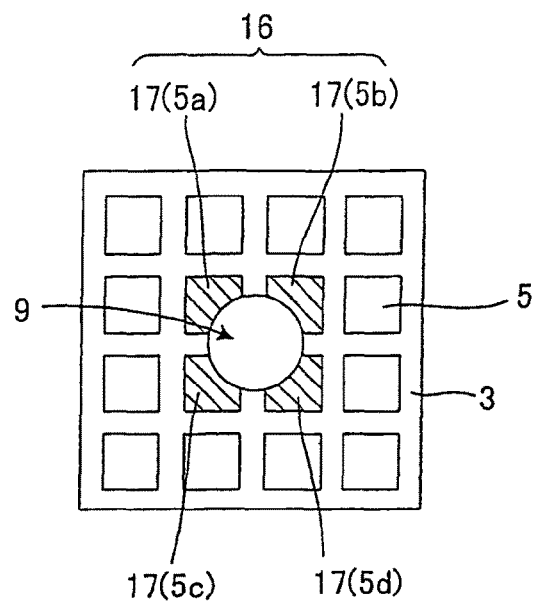
FIG. 4A is a schematic view illustrating a honeycomb structure with a sensor insertion hole, being another embodiment according to the present invention, a view illustrating the state in which after the insertion hole that is illustrated in FIG. 1 has been formed, cells therearound are applied or injected with a wall reinforcing member, and an enlarged view with a part enlarged.
Figure 4B:
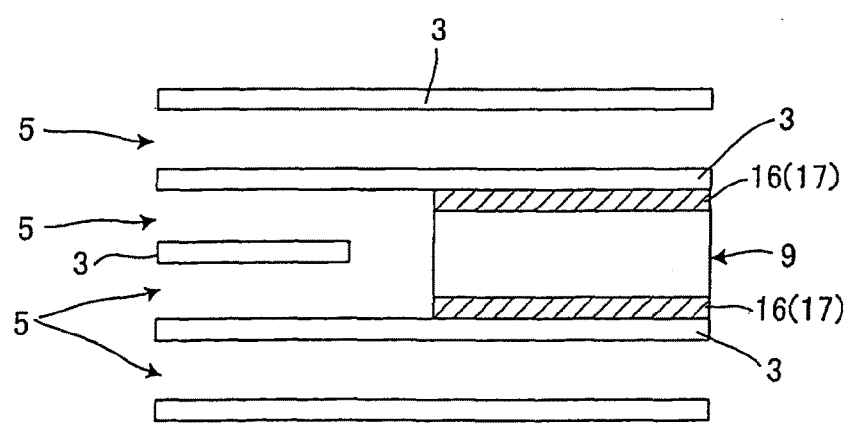
FIG. 4B is a view schematically illustrating the state of FIG. 4A in which the honeycomb structure is cross-sectioned in a length direction with the insertion hole a reference (center).
Figure 5A:
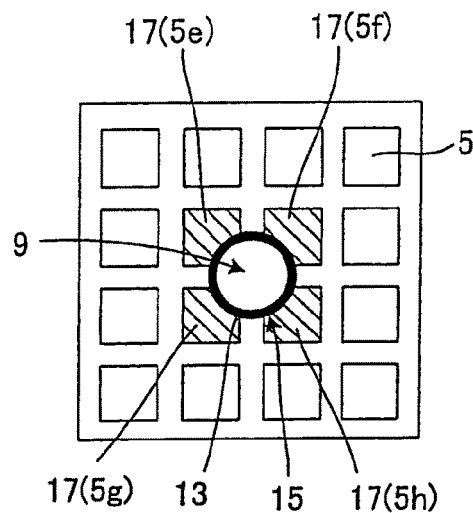
FIG. 5A is a schematic view illustrating a honeycomb structure with a sensor insertion hole to which another embodiment according to the present invention is applied, a view illustrating the sate in which after a sleeve insertion hole that is illustrated in FIG. 1 has been formed, a sleeve is inserted and cells therearound are applied or injected with a wall reinforcing member, and an enlarged view with a part enlarged.
Figure 5B:
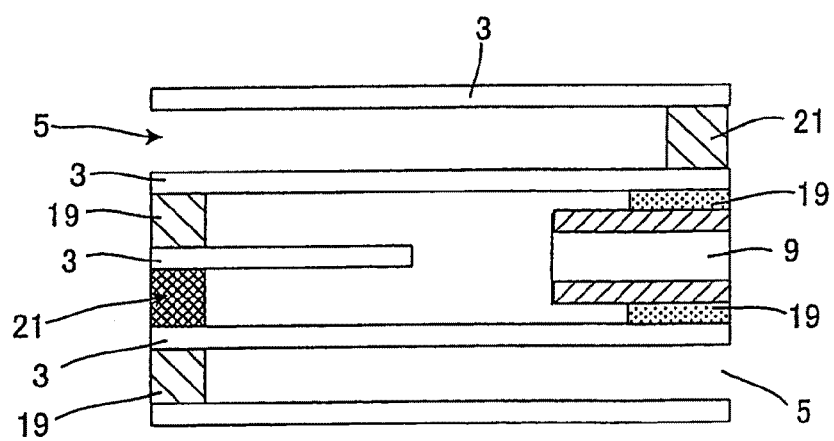
FIG. 5B is a view schematically illustrating the state of FIG. 5A in which the honeycomb structure is cross-sectioned in a length direction with the insertion hole a reference (center).

Specific examples in which this wall reinforcing member is applied or injected include FIGS. 4A, 4B, 5A and 5B.FIGS. 4A and 4B illustrate the state in which a reinforcing member 17 is injected in inner circumferential cells 5a to 5d of an insertion hole 9. In addition, FIGS. 5A and 5B illustrate the state in which a sleeve 13 is used together, and the reinforcing member 17 is injected in peripheral cells 5e to 5h of a sleeve insertion hole 15.

Incidentally, it is preferable that the application or injection of the above-described wall reinforcing member is conducted after the insertion hole (or a sleeve insertion hole) has been formed, or it is preferable that the wall reinforcing member is applied or injected before the insertion hole (or the sleeve insertion hole) is formed, and after this reinforcing member has been dried, the insertion hole (or the sleeve insertion hole) is formed. In the case of applying or injecting the wall reinforcing member after the insertion hole (or the sleeve insertion hole) has been formed, although there are some drawbacks to shape keeping of the insertion hole (or the sleeve insertion hole), since drilling of the insertion hole (or the sleeve insertion hole) is made only at the partition walls, a cutting work comes to be easy. On the other hand, in the case of forming the insertion hole after the wall reinforcing member has been applied or injected, since shape keeping of the insertion hole (or the sleeve insertion hole) needs not to be taken into consideration and a drilled shape comes to be the insertion hole (or the sleeve insertion hole) as it is, advantageously there is less dimension error. However, it is also necessary to drill the wall reinforcing member. Incidentally, in the case of using a sleeve together, after the insertion hole has been formed, the sleeve is inserted and the reinforcing member is applied and injected between the peripheral cells and the sleeve, whereby there can be provided both advantages thereof and therefore this case is desired.

This wall reinforcing member is preferably made of materials of superior heat resistance and corrosion resistance, and preferably ceramic materials such as alumina, cordierite, SiC, mullite, zirconia, $SiO_2$ or $Al_2TiO_5$ owing to superior heat stress suppressing properties or abrasion resistant properties.

When, however, the wall reinforcing member is applied or injected in the adjacent cells resided around the insertion hole and the inflow or the outflow of a fluid from these adjacent cells are impaired, as compared to the state before the reinforcing member is applied or injected, characteristics of a honeycomb will also be impaired. Further, the measurement using a sensor having been inserted in the insertion hole, due to the fact that the inflow or the outflow of a fluid is blocked, is not to be an accurate measurement. Therefore, the application or the injection of the reinforcing member is desired to be conducted so that the inflow or the outflow of a fluid is not blocked (is not prevented).

[1-2-1-1] Other Reinforcing Members:

It is most desired that as breakage prevention means, further the same material as that of an outer peripheral coat member or a plugging member is injected. With the arrangement, when a wall reinforcing member of the same material as that of the outer peripheral coat member or the plugging member is used, there will be no mismatch of a thermal expansion between the honeycomb structure and the DPF, and faults resulted from the formation of the insertion hole can be avoided, thus enabling to provide more advantages of this application.

[1-2-2] Sleeve:

Furthermore, it is desired that a sleeve is disposed as breakage prevention means. It is desired because the strength on the inner circumference and in the proximity of the insertion hole can be kept. In addition, the provision of such sleeve, in attachment or detachment of a sensor, can reduce the application of a stress at the time of its attachment or detachment to the adjacent cells. Further, it is desired because the application of damages to the sensor on the occasion of its attachment or detachment can be prevented. In addition, the provision of such sleeve prevents the leakage of a fluid and is to be measures against the leakage of soot in the case of the use as DPF.

The material of this sleeve is desired to be materials of superior heat resistance and corrosion resistance, and preferably ceramic materials such as alumina, cordierite, SiC, mullite, zirconia, $SiO_2$ or $Al_2TiO_5$ owing to heat stress suppressing properties or abrasion resistant properties; and further examples of metals include a stainless steel or the one whose main component material is a stainless steel, titanium based alloys, or the one of a structure in which a heat-resistant steel that is made of cobalt based alloys including stellite or the like is built up. However, the material or the shape of this sleeve is not limited to these ones, and insofar as a sleeve which material has e.g., heat resistant properties, the known sleeve can be used. The sleeve of the same material as that of the honeycomb structure or the DPF is most desired because there is no thermal expansion mismatch.

As the dimension of this sleeve, there are included, for example, an outside diameter of 3 mm to 25 mm, an inside diameter of 0.5 mm to 20 mm and a thickness of 0.5 mm to 15 mm, and a cylindrical shape, an angular shape, an elliptical shape, a separates structure or the like. On the inner surface of the sleeve, sensor dislodgment prevention means such as sensor dislodgment prevention depressions or projections, or screw processing can be provided.

Figure 6A:
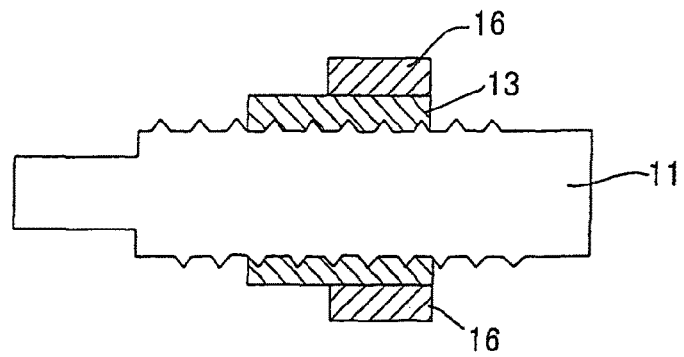
FIG. 6A is a schematic view illustrating an example of sensor dislodgement prevention means, and a view of illustration with a part enlarged in longitudinally cross-sectioned way.
Figure 6B:
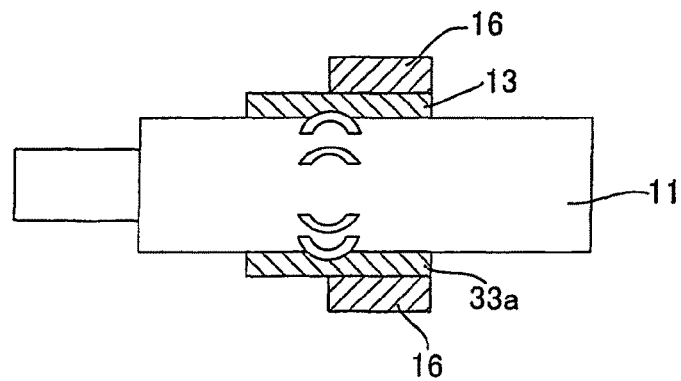
FIG. 6B is schematic view illustrating an example of sensor dislodgment prevention means, and a view of illustration with a part enlarged in longitudinally cross-sectioned way.
Figure 6C:
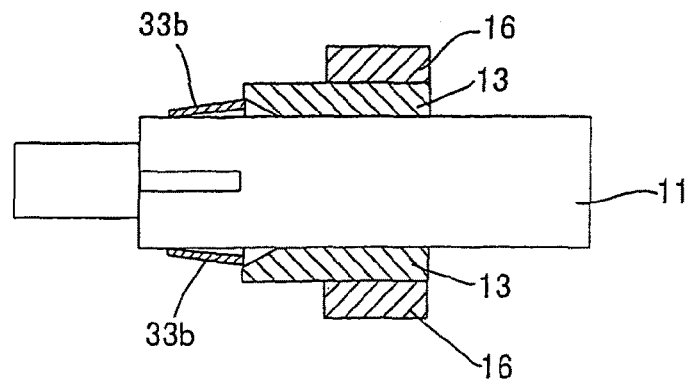
FIG. 6C is a schematic view illustrating an example of sensor dislodgment prevention means, and a view of illustration with a part enlarged in longitudinally cross-sectioned way.

Examples of sensor dislodgment prevention means include the ones that are illustrated in FIGS. 6A to 6C. In FIG. 6A, the uneven shape is formed on the inner surface of the sleeve 13 to be a male thread (or a female thread) and further the uneven shape is formed on the outer circumferential surface of the sensor 11 to be a female thread (or a male thread), to be in a screw structure. Whereby, depressions and projections at the inner surface of the sleeve and depressions and projections at the outer circumferential surface of the sensor are fitted and thus the dislodgment of the sensor is prevented. In FIG. 6B, a leaf spring 33a that is made of a plate-like member is disposed on the inner surface of the sleeve 13, thereby applying a biasing force toward the axis of the sleeve from the leaf spring 33a to prevent the dislodgment of a sensor 11. In FIG. 6C, at the leading end of the sleeve 13 (at the end portion positioned on the inside of the honeycomb structure in the case of attaching the sleeve of the honeycomb structure), there is disposed a leaf spring 33b that is made of a plate-like member, whereby at the leading end of the sleeve from the leaf spring 33b, a biasing force is applied toward the axis of the sensor 11 to prevent the dislodgment of the sensor 11.

Here, in the case of using the above-described sleeve together, it is desired to form the sleeve insertion hole which diameter is larger than that of the sensor insertion hole in a honeycomb. When using a sleeve which is dimensionally fitted to the sensor insertion hole, as a result, the inside diameter of the sleeve comes to be smaller and this inside diameter will be the diameter of the insertion hole of the sensor, and thus the sensor cannot be inserted. In addition, it is necessary to take into consideration thermal expansion mismatch with respect to the sleeve. Therefore, to be able to insert the sensor and to absorb the thermal expansion with respect to the sleeve, the dimension of the sleeve insertion hole in which the sleeve is inserted is made larger. Incidentally, as to the dimension of the sleeve insertion hole, for example, the one which clearance is about 25 μm to 100 μm can be preferably used, but it is not limited to these dimensions. In addition, in the case in which the sleeve and the honeycomb are made of the same material, since there are no effects of thermal expansion mismatch, the above-mentioned clearance can be filled with filler. Therefore, this case is more desired because of advantages of dislodgment prevention of the sleeve or soot leakage prevention.

In specific, as is illustrated in FIG. 5A, it is desired that the sleeve insertion hole in which the sleeve is put in is formed and thereafter the sleeve is inserted in this hole because the sensor can be easily attached or detached.

[1-2-3] Other Breakage Prevention Means:

Furthermore, it is desired to be an insertion hole in which breakage prevention means is provided, the insertion hole further including a space at a measurement portion or a low heat capacity portion. As is the above-described breakage prevention means, in the case of reinforcing an internal part of the sensor hole with a wall reinforcing member or a sleeve, the sensor measurement portion will be covered with the wall reinforcing member or the sleeve. In the case of temperature measurement, since this reinforcing part itself has its heat capacity, following characteristics of temperature of the sensor part comes to be worse. To avoid such event, it is desired that the reinforcing part is limited to a part of the end face side and a space is formed at the measurement portion, or materials of high porosity or the like are used and thus the reinforcing part is made to be of low heat capacity. Also in the case of measurement other than temperature measurement, by the provision of a space or highly porous materials of high gas permeability in a place of measurement, the measurement portion and the portion to be measured are not brought in disconnection, thus enabling to prevent worse following characteristics of measurement.

Figure 7A:
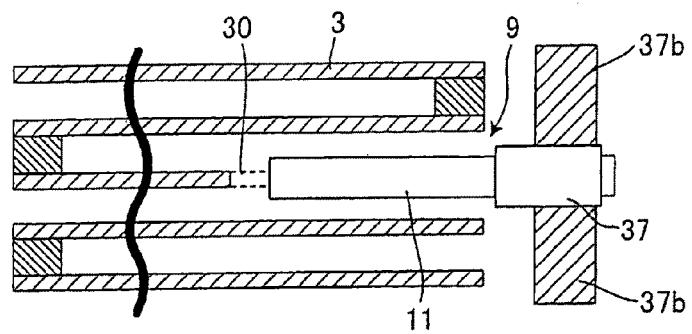
FIG. 7A is a view schematically illustrating the state in which a reinforcing part is attached as an example of breakage prevention means that is provided at a honeycomb structure with a sensor insertion hole, being another embodiment according to the present invention, and a view of illustration in longitudinally cross-sectioned way with a part enlarged as well as with a part omitted.
Figure 7B:
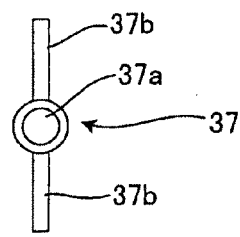
FIG. 7B is a front elevation view of the reinforcing part of FIG. 7A, and a view of schematic illustration with a part enlarged as well as with a part omitted.
Figure 7C:
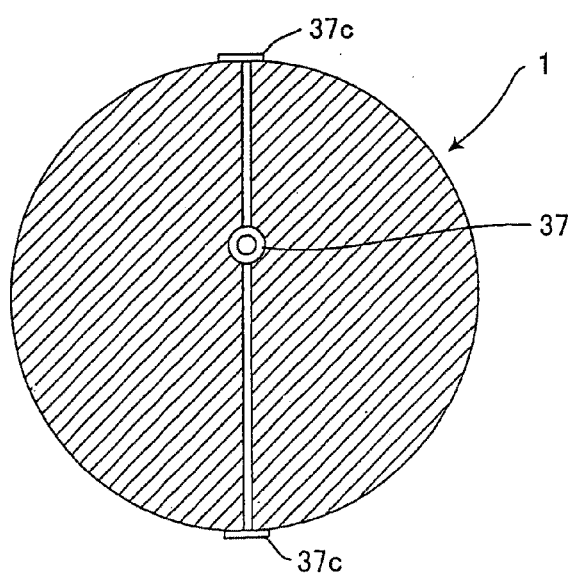
FIG. 7C is a view schematically illustrating the state in which the reinforcing part of FIG. 7A is attached, and a view of illustration with a part enlarged as well as with a part omitted.

Further, as breakage prevention means, the provision of an externally-attached reinforcing part is one of preferred modes. It is desired to provide such externally-attached reinforcing part because the manufacturing process of a honeycomb can be simplified. In specific, there is the one that is illustrated in FIGS. 7A to 7C as an example. As is illustrated in FIG. 7A, a sensor 11 is inserted in a reinforcing part hole 37a (FIG. 7B) that is formed at an externally-attached reinforcing part 37. As is illustrated in FIGS. 7B and 7C, there are formed at the externally-attached reinforcing part 37 arms 37b and 37b and mounting portions 37c and 37c. When the mounting portions 37c and 37c are attached to the outer peripheral surface of the honeycomb in such a manner as to sandwich the honeycomb while locating the arms 37b and 37b at the end face of the honeycomb, the sensor 11 can be easily mounted onto the honeycomb using the externally-attached reinforcing part 37, and therefore the use of this externally-attached reinforcing part 37 is desired. However, breakage prevention means is not limited to such reinforcing part, and any one which can act as a reinforcing part from the outside of the honeycomb, as well as can provide advantage of this application is widely included in breakage prevention means.

The material of this externally-attached reinforcing part is preferably the same material as that of piping or the material of heat resistance or corrosion resistance such as stainless, more preferably the combination with ceramics of low thermal expansion.

[1-3]: Honeycomb Structure and Other Constructions:

The honeycomb structure according to this embodiment is the one that is divided by highly porous partition walls, as well as that is formed of a plurality of cells acting as through channels of a fluid.

In specific, as is illustrated in FIGS. 1 to 3C, a honeycomb structure 1 is constructed of a plurality of cells 5 and formed with end faces 7 (7a and 7b) at both ends in its length direction. The honeycomb structure 1 is divided by a partition wall 3 of high porosity, as well as formed with cells 5 acting as through channels of a fluid. In addition, in the end face 7b, an insertion hole 9 in which a sensor can be inserted is formed. Incidentally, a fluid not only flows in or out from one (7a) of the end faces 7 to the other (7b) thereof, but also penetrates in or out from an adjacent cell to an adjacent cell through the highly porous partition wall 3.

Furthermore, preferably the inlet or the outlet of a cell in the same channel as the cell proximate to the outer periphery of the insertion hole at the end face opposite to the end face in which the insertion hole of the honeycomb structure is formed is additionally plugged. Such construction is desired because the flow of a fluid from the inlet to the outlet can be kept and characteristics of the honeycomb can be ensured. That is, it is possible to prevent the fluid from coming out of the desired flow to be leaked or to flow backward.

Figure 9:
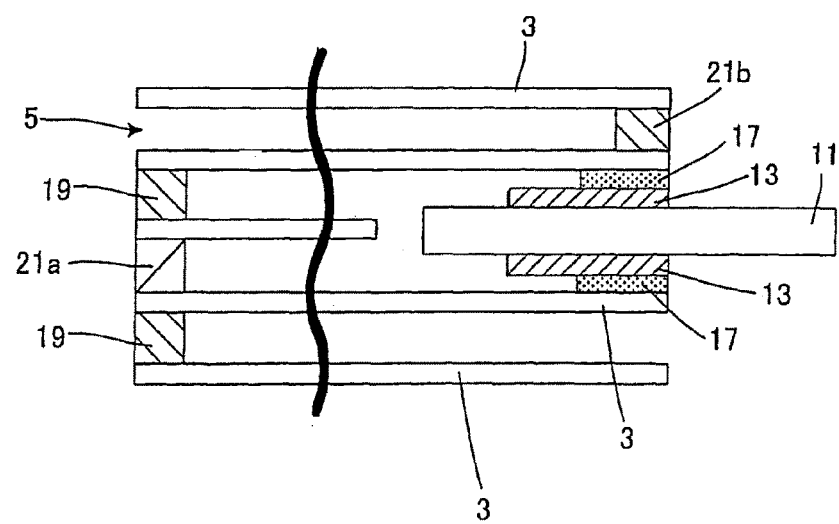
FIG. 9 is a schematic view illustrating a honeycomb structure with a sensor insertion hole to which an embodiment according to the present invention is applied, and a view illustrating the state in which an additional plugging is applied.

In specific, as is illustrated in FIG. 9, it is preferable that after plugging parts that are alternately plugged have been formed at the end face of the honeycomb structure, additionally a plugging 21a is applied to the end face, being the inlet side of a fluid. Furthermore, it is one of preferred modes that additionally a plugging 21b is also formed as is necessary at the end face, being the outlet of a fluid or on the way of the channel.

[1-3-1] Sensor:

Examples of sensors that can be inserted in this embodiment include a temperature (measurement) sensor, an oxygen concentration (measurement) sensor and a $NO_x$ concentration (measurement) sensor. These sensors are used for OBD measurement or measurement of oxygen concentration or $NO_x$ concentration. Incidentally, a sensor is not limited to these sensors, and insofar as a sensor that can be inserted, the one in which various sensors are inserted in accordance with e.g., measurement application are included in the sensor that can be attached to this application.

Figure 8:
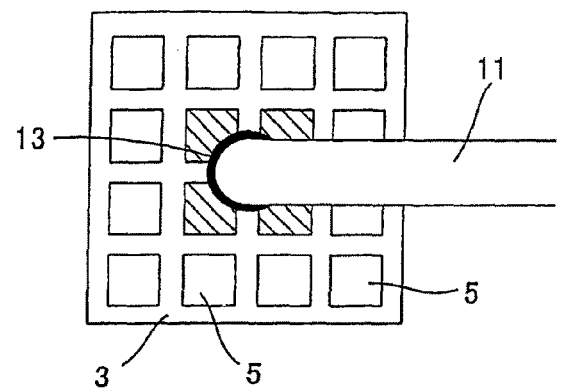
FIG. 8 is a schematic view illustrating a honeycomb structure with a sensor insertion hole to which an embodiment according to the present invention is applied, and a view illustrating the state in which a sensor is inserted in the insertion hole of FIG. 5A.

As to attachment or detachment of this sensor, for example, as is illustrated in FIG. 8, in the case in which a sleeve is provided, when a sensor is inserted so as to be pressed into this sleeve, the sensor can be mounted (attached) to the honeycomb. Further, in the case in which a sensor is detached from the honeycomb, a part of the sensor that is extended from the honeycomb is grubbed and pulled out, and thus the sensor can be detached.

Further, it is one of preferred modes that a sensor can detect the blocked state of a cell. With the arrangement, it is desired that the sensor to be inserted in the sensor insertion hole can detect the blocked state of a cell because the blocked state of a cell can be measured with no destruction. For example, as a mechanism of Ash accumulation, generally Ash is accumulated in order from the (downstream) end face side on the outflow side of an exhaust gas, and the pressure drop in the cells tends to increase. Finally, when the cells are filled with Ash to be in the blocked state, an exhaust gas will not penetrate the partition wall to flow to the adjacent cell. On this occasion, as is this embodiment, when the sensor is inserted in the insertion hole to measure e.g., gas temperature, the rise of temperature or the like can be detected in the state in which Ash is not sufficiently accumulated; whereas, when Ash is sufficiently accumulated, since (detecting portion provided at) the leading end of the sensor is buried under Ash, the sensor having been detecting the rise of temperature and the like till then suddenly comes not to be responsive. That is, due to the fact that the temperature to be detected by the sensor does not rise, Ash is found to be built up (accumulated) up to the leading end position of the sensor, thus enabling to detect the blocked state of a cell. In other words, since the sensor cannot detect e.g., the rise of temperature, the blocked amount with Ash in the state of no gas flow due to accumulated Ash can be measured by the sensor.

Incidentally, conventionally, the amount of Ash in the above-described Ash accumulated mode cannot be directly detected. Further, also in the case of an indirect detection from a pressure drop, between soot accumulated mode and soot burned mode by spontaneous regeneration or forced regeneration during traveling, there are some cases of the occurrence of pressure drop hysteresis of different pressure drops even at the same accumulated amount of soot, and thus highly accurate sensing (Ash amount estimation from pressure drop detection) cannot be conducted. In this embodiment, however, by disposing stepwisely or continuously sensors that can make a direct sensing, more highly accurate sensing (Ash amount detection) can be made. Due to highly accurate Ash amount detection, correction of the accumulated amount of soot accompanied by the relative reduction of the capacity of a honeycomb carrier owing to the blockage with Ash can be conducted more accurately. For example, in the case in which the soot accumulation limit is 5 g/L, in case where an actual capacity comes to be half owing to the blockage with Ash, since the accumulated amount of soot is concentrated at the capacity portion of the upstream-side half, actually 10 g/L is to be accumulated. In such case, although the original soot accumulation limit needs to be corrected to 2.5 g/L, being half, to make a correction, it is necessary to know the blocked amount with Ash with high accuracy.

Here, "blocked amount with Ash" is to be the capacity of cells in the state in which the cells are blocked with Ash and no gas flows. In the case of the state in which cells are not blocked and gas flows, since the cells function as a filter, even if a little Ash is accumulated on the surface of the partition walls, it is not included in the blocked amount with Ash herein. Incidentally, depending on the maximum mileage to be supposed, as the position of mounting a sensor to detect the blocked state of cells (position of the detecting portion of a sensor), the sensor is desired to be mounted not less than 30 mm from the outlet end face and not more than ½ the full length of the honeycomb. When Ash is accumulated up to these positions, since the pressure drop becomes high to be brought in the blocked state in which no exhaust gas flows, engine running will be hindered. Furthermore, "pressure drop hysteresis" is referred to as the state of different pressure drops even at the same accumulated amount of soot between the soot accumulated mode and the soot burned mode by the spontaneous regeneration or the forced regeneration during traveling.

Preferred examples of sensors detecting the blocked amount with Ash in the honeycomb include a thermocouple or an oxygen sensor, a pressure sensor, a soot sensor, or an electrostatic capacity sensor.

Further, the detection method of the blocked amount, it is desired that a sensor hole is formed in a plurality of cells, a part thereof is reinforced, and a sensor is mounted therein, thereby detecting the blocked amount of cells in the honeycomb structure. For example, as the detection method of the blocked amount, in the case of measuring the blocked amount with Ash, the following methods can be conducted. The above-described sensor is set in the insertion hole, and in the state in which e.g., the rise of temperature cannot be detected, an alarm display or the like is performed to make measurements; sensors are set in a plurality of positions to output signals stepwisely; and by using an electrostatic capacity sensor or the like, the blocked state with Ash is continuously monitored. Conventionally, to directly detect the blocked amount with Ash, there is no way but to use a large-scale device such as X-ray CT, to make a cross sectional observation, or to insert a rod into an internal part of cells to obtain its length that can be inserted. It is impossible to output signals during traveling, and a user has to mostly rely on indirect means such as pressure drop. On the other hand, to directly set a sensor in the cells, the honeycomb partition wall is too thin and the cell is too small, so that the sensor cannot even be inserted without the application of damages to the cells. Still further, such a mounting that can be resistant to states in traveling cannot be thought, and a technique development of direct sensing is found to be extremely difficult.

[2]: DPF:

In addition, it is preferred to be used as a filter for purification of a diesel exhaust gas. When the above-described honeycomb structure is applied to a filter for purification of a diesel exhaust gas as a base body, since the control of temperature is easy as well as the measurement of an oxygen concentration or an NO, concentration becomes easy, this honeycomb structure can be preferably used in DPF, which is therefore desired.

[3]: Other Constructions of the Honeycomb Structure:

Further, the honeycomb structure of this embodiment according to the present invention is a tubular one which has highly porous partition walls and in which a plurality of cells acting as through channels of a fluid is defined and formed by the partition walls. The material of the honeycomb structure according to the present invention, in respect of strength, heat resistance or the like, preferably is the one whose main crystal phase is any one kind selected from the group consisting of cordierite, silicon carbide, alumina, zeolite, mullite, aluminum titanate and LAS (lithium aluminum silicate). Incidentally, when slurry of a slurry-like plugging member is made the same as is the honeycomb structure, there are effects of the coincidence of both thermal expansion coefficients. Although the honeycomb structure is circular in the cross sectional shape perpendicular to the axis (shape of the bottom), it is preferable to be, for example, elliptical, oval, polygonal such as quadrilateral, odd-form or the like. Furthermore, the shape in the cross section (cross section perpendicular to the axial direction of the honeycomb structure) of a cell is not particularly limited as well; and it is preferably quadrilateral, but may be polygonal such as triangular or hexagonal.

In addition, in the case providing that the sum total of areas in the cross section perpendicular with respect to the longitudinal direction of the above-mentioned predetermined cells whose one end portion is plugged is A (mm$^2$) and providing that the sum total of areas in the cross section perpendicular with respect to the longitudinal direction of the above-mentioned remaining cells whose other end portion is plugged is B (mm$^2$), it is also one of preferred modes to be in the relationship of A<B. Further, it is also one of preferred modes that the cross sectional shape perpendicular with respect to the longitudinal direction of the above-mentioned predetermined cells whose one end portion is plugged and the cross sectional shape perpendicular with respect to the longitudinal direction of the above-mentioned remaining cells whose other end portion is plugged are formed to be different (hereinafter, it is properly referred to as "cells of large or small opening cross sectional areas".

As described above, the cross sectional shape of the cell 5 (shape in the cross section perpendicular with respect to the longitudinal direction of the cell 5) is not particularly limited, and cells that are formed to be, for example, polygonal, circular, elliptical, a racing track shape, the ones of these shapes apart of which are deformed, and the like can be included as an example. The honeycomb structure, in the case of using as a DPF, is generally constructed such that all cells have the same cross sectional shape (normally, quadrilateral) and the same opening area, and at the ends of these cells, the open area ratio at the end face on the inlet side of an exhaust gas and the open area ratio at the end face on the outlet side are the same.

Figure 14A:
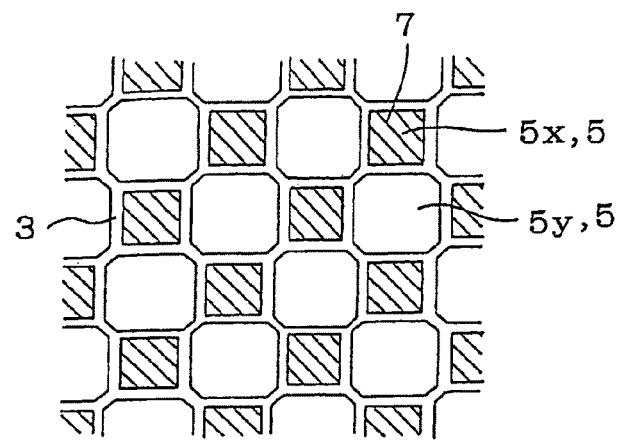
FIG. 14A is a schematic view illustrating a honeycomb structure with a sensor insertion hole to which another embodiment according to the present invention is applied, and a front elevation view of schematically illustrating plugging of different open area ratios between at one end face and at the other end face with a part enlarged.
Figure 14B:
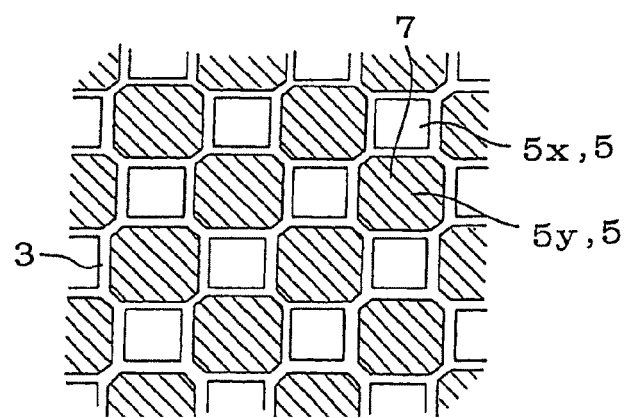
FIG. 14B is a schematic view illustrating a honeycomb structure with a sensor insertion hole to which another embodiment according to the present invention is applied, and a back elevation view of schematically illustrating plugging of different open area ratios between at one end face and at the other end face with a part enlarged.

However, the cross sectional shape of the cells 5 needs not to be single, and it is a preferred mode that the cross sectional shape of the cells 5 is, for example, octagonal and quadrilateral. FIG. 14A is a front elevation view and FIG. 14B is a back elevation view. These FIGS. 14A and 14B are views illustrating an embodiment of a plugged honeycomb structure which open area ratios are different between at one end face and at the other end face. In the mode illustrated in FIGS. 14A and 14B, quadrilateral cells 5x and octagonal cells 5y whose opening area is larger are disposed alternately in two directions crossing at right angles at each end face. Further, the quadrilateral cell 5x is plugged with a plugging member 7 at one end face, and the octagonal cell 5y is plugged with a plugging member 7 at the other end face. With the arrangement, the octagonal cell 5y of larger opening area is made to be open at one end face and the quadrilateral cell 5x of smaller opening area is made to be open at the other end face, whereby the open area ratio at the one end face can be made larger than the open area ratio at the other end face.

Furthermore, in the case of using the honeycomb structure as a DPF, providing that one end face is the inlet side of an exhaust gas and providing that the other end face is the outlet side of an exhaust gas, as compared to the DPF (plugged honeycomb structure) which cross sectional shapes of cells are single (for example, all are quadrilateral) and which cross sectional areas of cells are the same, in the honeycomb structure provided with cells of large or small opening cross sectional areas or in the honeycomb structure provided with cells which opening shapes are different, although the inclination of the rise of pressure drop accompanied by the accumulation of soot becomes small, it is to be a large range of fluctuation of the accumulated amount of soot with respect to the change of pressure drop, thus meaning that the accumulated amount of soot comes to be hard to detect. Therefore, the application of the present invention to the honeycomb structure having cells of large or small opening cross sectional areas or the honeycomb structure having cells of different opening shapes, as compared to the case of application to a normal honeycomb structure, leads to particularly greater effects of improved detection accuracy of the accumulated amount of soot, and is therefore desired. In addition, in the honeycomb structure having large or small opening cross sectional areas or in the honeycomb structure having cells which opening shapes are different, since the capacity of the inlet side cells comes to be larger, more Ash can be accumulated. In other words, in the case of obtaining a predetermined Ash accumulation capacity, the honeycomb structure itself can be made compact. However, in respect of detection of the accumulated amount of Ash, it is in a disadvantageous structure, an Ash accumulation margin thereof needs to have, and thus preferred down sizing cannot be achieved. This reason is as follows. In the above-described honeycomb structure provided with cells of large or small opening cross sectional areas or in the above-described honeycomb structure provided with cells of different opening shapes, in the case of detecting the accumulated amount of Ash, as is the detection of the accumulated amount of soot, although the inclination of the rise of pressure drop accompanied by Ash accumulation, the range of fluctuation of the accumulated amount of Ash with respect to the change of pressure drop is to be large, and thus the detection of the accumulated amount of Ash becomes difficult. With the arrangement, by the application of the present invention to the honeycomb structure provided with cells of large or small opening cross sectional areas or to the honeycomb structure provided with cells of different opening shapes, Ash accumulation margin at direct sensing needs not to have, and thus preferred down sizing can be achieved.

Further, the porosity or the average pore diameter of the partition wall is not particularly limited, and has only to be the porosity or the average pore diameter in ceramics that can be used in e.g., exhaust gas processing. Although the thickness of the partition wall is not particularly limited, when the thickness of this partition wall is too large, in some cases, the pressure drop on the occasion when a fluid penetrates comes to be large; and when this thickness is too small, in some cases, the mechanical strength comes to be insufficient. The thickness of the partition wall is preferably 100 μm to 1000 μm, more preferably 200 μm to 800 μm. The cell density is not particularly limited, but preferably 5 cells/cm$^2$ to 300 cells/cm$^2$, more preferably 10 cells/cm$^2$ to 100 cells/cm$^2$, still more preferably 15 cells/cm$^2$ to 50 cells/cm$^2$. This reason is that the thinner the wall is and the lower the cell density is, the lower the strength is and the larger the gap with respect to the sensor insertion hole is; and the thicker the wall is and the higher the cell density is, the larger the pressure drop is.

More preferably, the material of a honeycomb filter is ceramics, and its average pore diameter thereof is 1 μm to 20 μm. In particular, in the case of using as a DPF, conventionally in the case of non-strict collection regulations of soot, influences of soot leakage from the gap between a sensor and a sensor hole are not so large. However, in the case of a superior collection performance of soot is strictly required, even a little leakage of soot cannot be permitted. Particularly in the case of number counting as a collection performance, by the combination of a honeycomb filter having an optimum pore diameter and the sensor insertion hole structure according to the present invention, effects of providing both a high collection performance and a highly accurate control can be expected. The optimum pore diameter is preferably 1 μm to 20 μm, more preferably 10 μm to 15 μm in respect of both a pressure drop and a collection performance.

Examples of formation methods of a honeycomb structure include, for example, extrusion molding, injection molding, press molding or the method in which a ceramic raw material is formed in a cylindrical shape and thereafter through pores (cells) are formed. From the viewpoint that a continuous formation is easy as well as a cordierite crystal is orientated to be able to have low thermal expansion properties, extrusion molding is desired. In addition, extrusion molding is conducted in any direction of a lateral (horizontal) direction, a longitudinal (vertical) direction and an oblique direction. The extrusion molding can be conducted using, for example, a ram extrusion molding machine, a bi-axial screw continuous extrusion molding machine and the like. On the occasion of extrusion molding, using a die having the desired cell shape, partition wall thickness and cell density, a honeycomb molded body of the desired honeycomb structure can be manufactured.

Further, although in the embodiments hitherto, have been described a honeycomb structure of integral formation in which a partition wall of defining and forming cells and an outer wall are integrally formed or a honeycomb structure in which an outer wall is additionally formed on the outer peripheral portion of the partition walls, the present invention is applicable to, for example, a honeycomb structure having a segment structure. In this case, it is desired to form a sensor hole in the vicinity of the center of the segment, particularly in an area in which the cross sectional area of the segment is within 60%. This reason is that effects of a bonded portion can be suppressed to a minimum in temperature or the flow of gas.

[3-1] Multi-Layered Structure:

In addition, it is one of preferred modes that a partition wall is constructed to be of multi-layered structure having a highly porous partition wall base member and a surface layer of at least one layer that is formed only on the inflow side or both on the inflow side and on the outflow side of a fluid at this partition wall base member. With the arrangement, the partition wall is of multi-layered structure having a highly porous partition wall base member and a surface layer (the so-called highly porous coat layer) that is formed only on the inflow side or both on the inflow side and on the outflow side of an exhaust gas (fluid) at this partition wall base member, whereby at the partition wall surface, the penetration of fine grains is impeded, as well as soot is accumulated only on the surface layer and comes not to be accumulated in an internal part of the base member. As a result, in proportion with the amount of soot that is accumulated on the surface layer, the pressure drop is linearly changed. Therefore, since the estimation accuracy of the amount of soot by the detection of pressure drop is improved, the regeneration control of soot can be conducted with higher accuracy. However, since the higher the accuracy of control is, on the contrary, the less a detection margin is, it will be effective to combine error detection such as the over-rise of temperature with the present invention enabling a direct sensing.

Here, FIG. 15 is a partially cross sectional view of schematically illustrating an enlarged partition wall of a honeycomb structure with a sensor insertion hole according to this embodiment. In a mode illustrated in FIG. 15, the partition wall 3 is provided with a surface layer 28 on the inflow side (only) of a partition wall base member 29. In the mode as illustrated in this FIG. 15, in the case of using the honeycomb structure with the sensor insertion hole according to this embodiment as a DPF, an exhaust gas (fluid) flows in an open (non-plugged) cell from one end face side, penetrates the partition wall 3 from the side where the surface layer 28 is formed to the side of the partition wall base member 29, flows to an open (non-plugged) cell from the other end face side, and flows out to the outside from the other end face. With the arrangement, since while preventing the penetration of fine grains on the surface of the partition wall, soot is accumulated only on the surface layer to be unlikely to be accumulated in an internal part of the base member, in proportion with the amount of soot accumulated on the surface layer, a pressure drop is to be linearly changed. Thus, as described above, it is desired because advantages of this application can be widely provided.

Incidentally, the above-described surface layer (the so-called highly porous coat layer) can be obtained, for example, by the method in which at manufacturing, a raw material of a coat layer containing a space forming agent is applied to a partition wall of a highly porous base member, and thereafter a pore-forming material is burned. Preferred examples of this surface layer include materials whose main component is ceramics, a heat resistant paper or a sintered metal. In specific, in the case of made of materials whose main component is ceramics, preferred examples of ceramics include silicon carbide, cordierite, aluminum titanate, sialon, mullite, silicon nitride, zirconium phosphate, zirconia, titania, alumina, silica, zeolite and LAS (lithium aluminum silicate), or the combination thereof. In particular, ceramics such as silicon carbide, cordierite, mullite, silicon nitride, alumina and aluminum titanate can be preferably used in respect of alkali resistant properties.

[3-2] Plugging Part:

In this embodiment, it is desired that a plugging part (plugging part) is formed. Incidentally, this plugging part (plugging part) can employ the one that is constructed as is a plugging part to be conventionally used on the occasion when the opening end portion of a cell of a honeycomb structure is plugged to be used as a filter.

This plugging part, in the case in which the shape in the cross section perpendicular to the axial direction of a cell is quadrilateral, is preferably formed at the opening end portion of each cell so that the above-mentioned predetermined cells and the above-mentioned remaining cells are alternately located.

Incidentally, although this plugging part is preferably the one that is made of the same material as that of the partition wall, it is desired to be the one that is made of the same material as well as the porosity is higher than that of the partition wall and the Young's modulus is smaller than that of the partition wall. With the arrangement, the breakage due to the difference in thermal expansion can be prevented. The raw material of the plugging member includes as an example the one that is obtained by mixing a ceramic raw material, a pore-forming material, a surface-active agent, water and the like to make it slurry, and thereafter kneading and mixing it using e.g., a mixer.

Incidentally, an example of the plugging part includes the one in which a predetermined cells which one end portion is open as well as which has the plugging part (sealing part) at the other end portion, and the remaining cells which has the plugging part (sealing part) at the above-mentioned one end portion as well as which other end portion as mentioned above is open are alternately disposed; and each end face is formed in a checkerboard design by the plugged (sealed) cells and the non-plugged (non-sealed) cells. The material of the plugging part to form plugging in the open frontal area of a cell is not particularly limited, but preferably alumina, cordierite, SiC, aluminum titanate, mullite, zeolite and AlN and $Si_2N_4$, and among these materials, in respect of superior heat resistant properties and resistance to thermal shock, more preferably cordierite, SiC, aluminum titanate and mullite.

The depth of coming in the cell from the end face of the honeycomb structure of the plugging part is not particularly limited, but from the viewpoint that the pressure drop is decreased, a catalyst effective area at the time of loading catalyst is increased, and the strength is made larger, preferably 1 mm to 20 mm.

In addition, the present invention is preferably used as a filter for purification of a diesel exhaust gas. The present invention can be preferably used in a converter of the above-described honeycomb structure or filter subjected to canning and attached with a sensor.

EXAMPLES

Hereinafter, the present invention will be specifically described further with examples, but the present invention is not limited to these examples. Furthermore, various evaluations and measurements in examples are made by the following methods.

Example 1

Figure 11A:
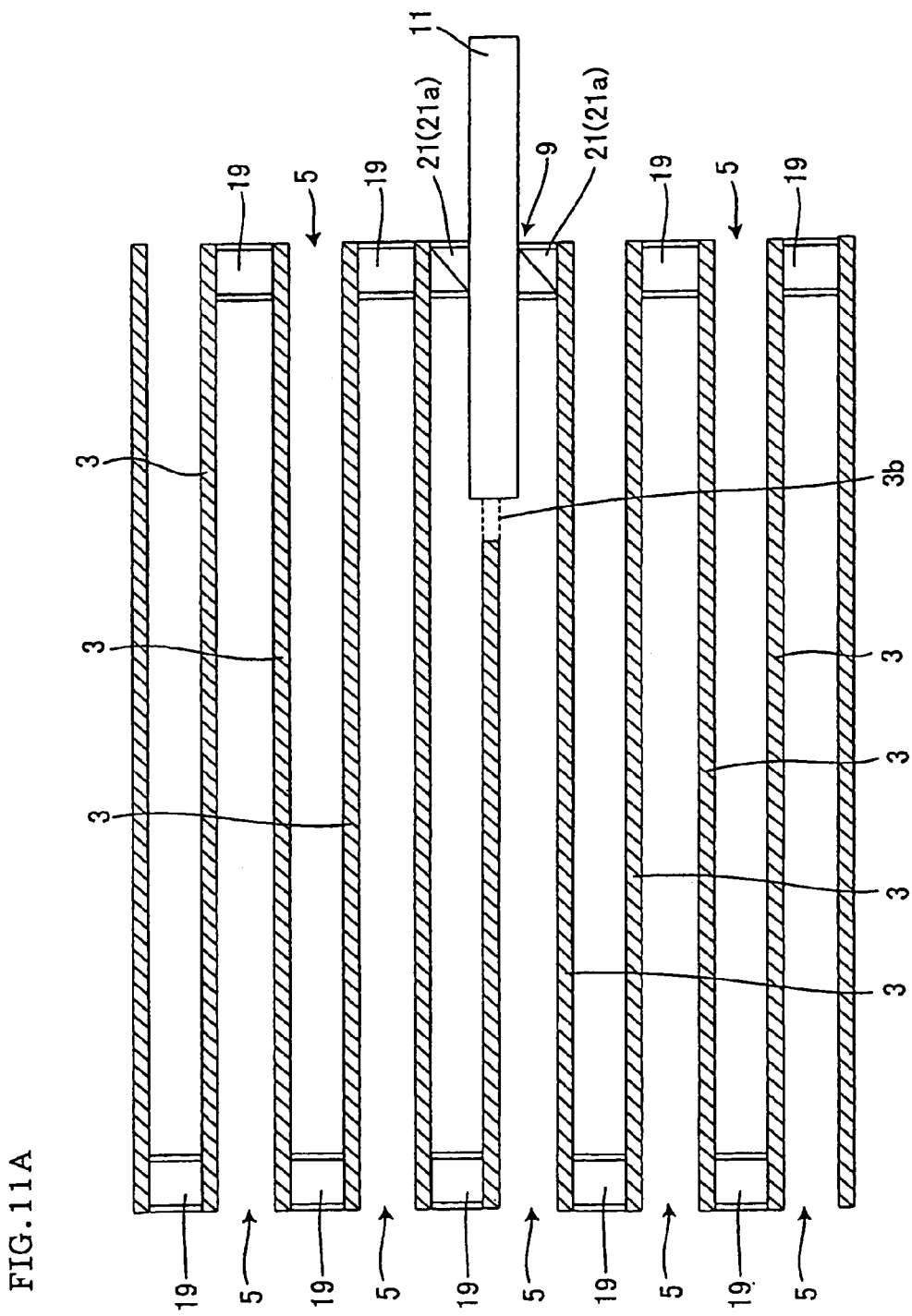
FIG. 11A is a schematic view illustrating a part of a honeycomb structure with a sensor insertion hole to which an embodiment according to the present invention is applied, and a view illustrating the cross section of a DPF of Example 1 and the state in which a sensor is attached.

As illustrated in FIG. 11A, a cordierite DPF of 0.305 mm (12 mil) wall thickness, 46.5 cells/cm$^2$ (300 cells/in$^2$), 143.8 mm (5.66 in) outside diameter×152.4 mm (6 in) (length), 52% porosity and 15 μm average pore diameter, the cordierite DPF was disposed in a checkerboard design at a plugging part on the gas inlet side and at the outlet side end face. In the central portion of the end face of plugging on this outlet side, a hole of 5.3 mm Dia and 20 mm depth was formed, the portion 10 mm from the outlet end face was reinforced with a plugging member, and a sensor hole of 3.3 mm inside diameter was formed in this reinforcing part. The sensor hole was 20 mm in depth.

Example 2

Figure 11B:
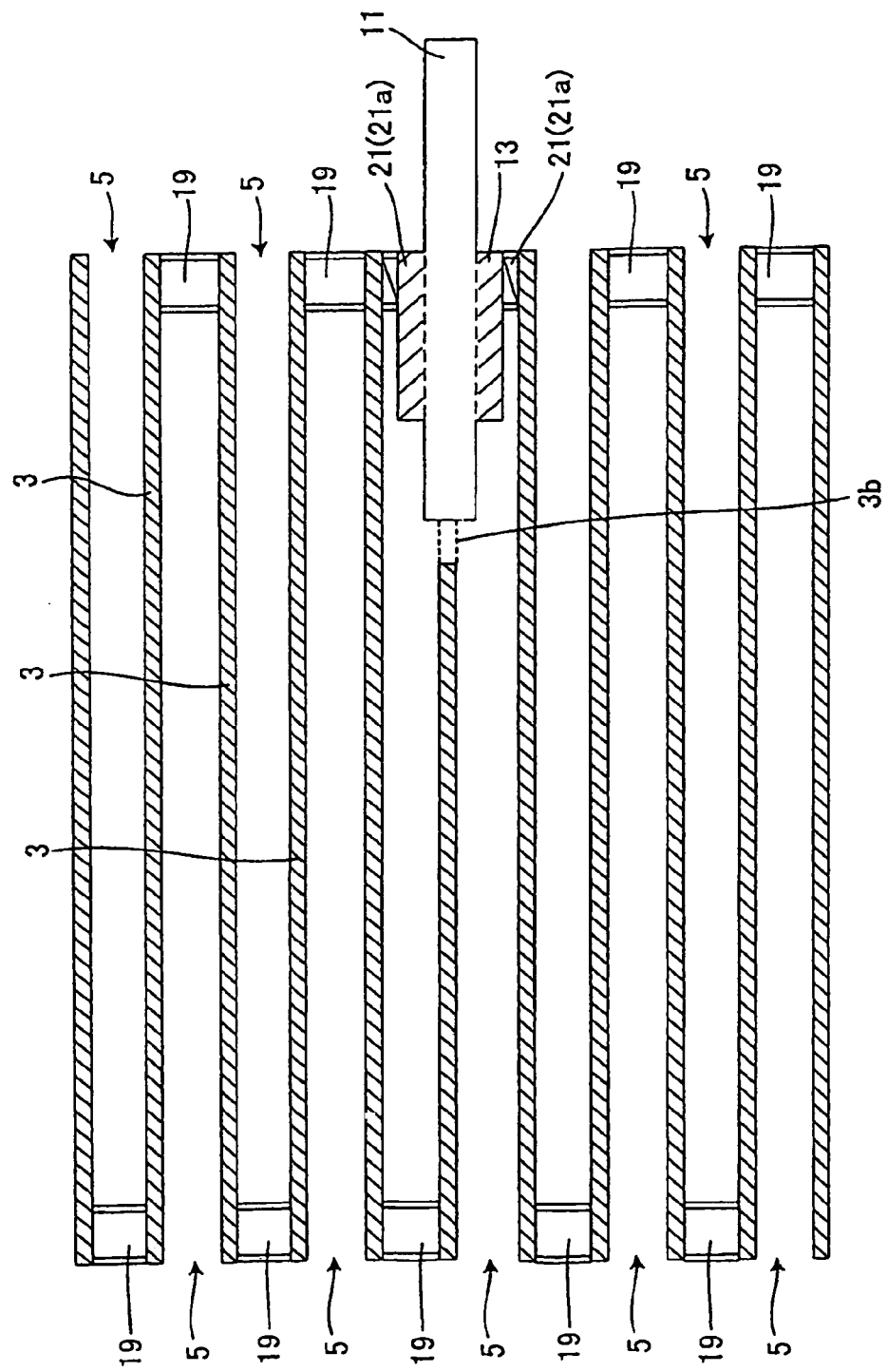
FIG. 11B is a schematic view illustrating a part of a honeycomb structure with a sensor insertion hole to which another embodiment according to the present invention is applied, and a view illustrating the cross section of a DPF of Example 2 and the state in which a sensor is attached.

As illustrated in FIG. 11B, a cordierite DPF of 0.305 mm (12 mil) wall thickness, 46.5 cells/cm$^2$ (300 cells/in$^2$), 143.8 mm (5.66 in) outside diameter×152.4 mm (6 in) (length), 52% porosity and 15 μm average pore diameter, the cordierite DPF was disposed in a checkerboard design at a plugging part on the gas inlet side and at the outlet side end face. In the central portion of the end face of plugging on this outlet side, a hole of 5.5 mm Dia and 20 mm depth was formed, the portion 10 mm from the outlet end face was reinforced with a plugging member, and a sleeve that is made of alumina of 5.3 mm outside diameter, 3.3 mm inside diameter and 12 mm length was inserted in this reinforcing part, to form a sensor hole. The sensor hole was 20 mm in depth, and there was provided a space of 8 mm depth in the rear of the sleeve.

Example 3

As illustrated in FIG. 1C, a cordierite DPF of 0.305 mm (12 mil) wall thickness, 46.5 cells/cm$^2$ (300 cells/in$^2$), 143.8 mm (5.66 in) outside diameter×152.4 mm (6 in) (length), 52% porosity and 15 μm average pore diameter, the cordierite DPF was disposed in a checkerboard design at a plugging part on the gas inlet side and at the outlet side end face. In the central portion of the end face of plugging on this outlet side, a hole of 5.5 mm inside diameter and 20 mm depth was formed, the portion 10 mm from the outlet end face was reinforced with an outer peripheral coat member, and a sleeve that is made of cordierite of 5.3 mm outside diameter, 3.3 mm inside diameter and 12 mm length was inserted in this reinforcing part and secured by drying, to form a sensor hole. The sensor hole was 20 mm in depth, and there was provided a space of 8 mm depth in the rear of the sleeve.

Example 4

Figure 11D:
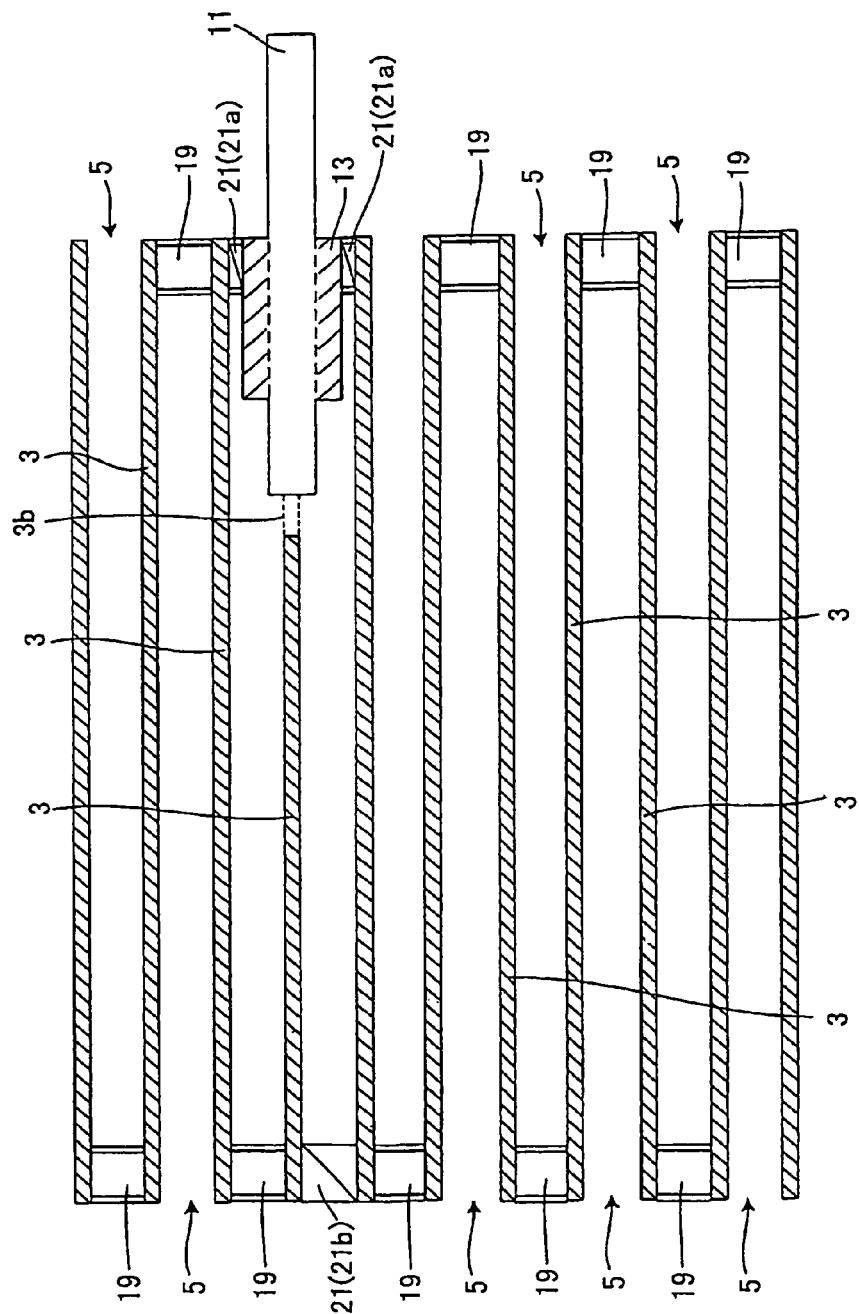
FIG. 11D is a schematic view illustrating a part of a honeycomb structure with a sensor insertion hole to which another embodiment according to the present invention is applied, and a view illustrating the cross section of a DPF of Example 4 and the state in which a sensor is attached.

As illustrated in FIG. 11D, a cordierite DPF of 0.305 mm (12 mil) wall thickness, 46.5 cells/cm$^2$ (300 cells/in$^2$), 143.8 mm (5.66 in) outside diameter×152.4 mm (6 in) (length), 52% porosity and 15 μm average pore diameter, the cordierite DPF was disposed in a checkerboard design at a plugging part on the gas inlet side and at the outlet side end face. In a position 35 mm off-center to the outside from the center of the end face of plugging on this outlet side, a hole of 3.8 mm inside diameter and 20 mm depth was formed, the portion 10 mm from the outlet end face was reinforced with a plugging member, and a sleeve that is made of cordierite of 3.7 mm outside diameter, 1.7 mm inside diameter and 12 mm length was inserted in this reinforcing part and secured by sintering, to form a sensor hole. The sensor hole was 20 mm in depth, and there was provided a space of 8 mm depth in the rear of the sleeve. The number of cells of the sensor hole was 9, and all the open cells on this inlet side were additionally plugged.

Comparative Example 1

Figure 12A:
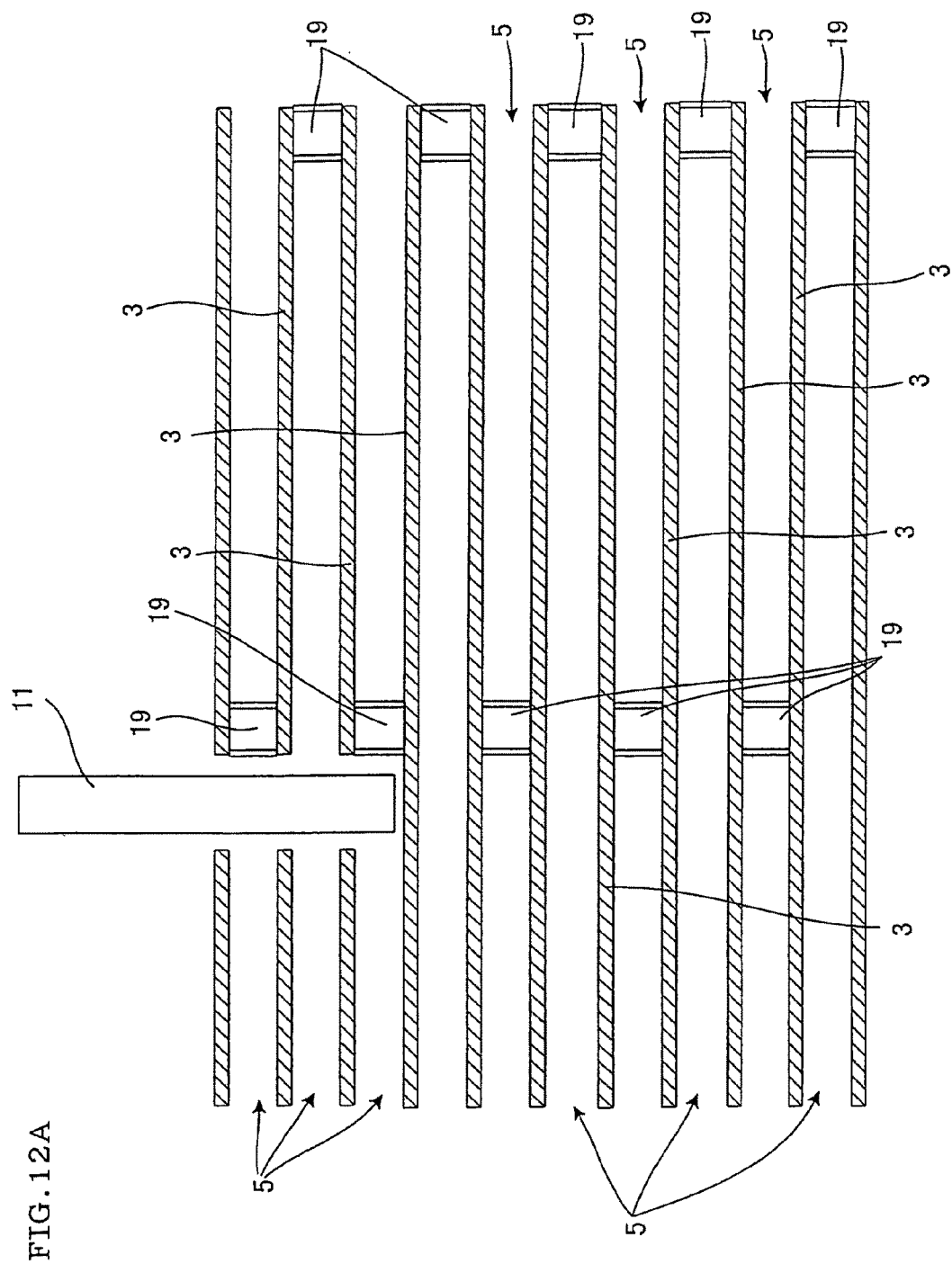
FIG. 12A is a view schematically illustrating the cross section of a part of a DPF of Comparative Example 1 and the state in which a sensor is attached.

As illustrated in FIG. 12A, a cordierite DPF of 0.305 mm (12 mil) wall thickness, 46.5 cells/cm$^2$ (300 cells/in$^2$), 143.8 mm (5.66 in) outside diameter×152.4 mm (6 in) (length), 52% porosity and 15 μm average pore diameter, the cordierite DPF was disposed in a checkerboard design in a place where the plugging part on the gas inlet side is shifted 40 mm rearward from the inlet end face, and on the outlet side end face. In the side face forward of plugging on this inlet side, a sensor hole of 4 mm inside diameter and 50 mm depth was formed.

Comparative Example 2

Figure 12B:
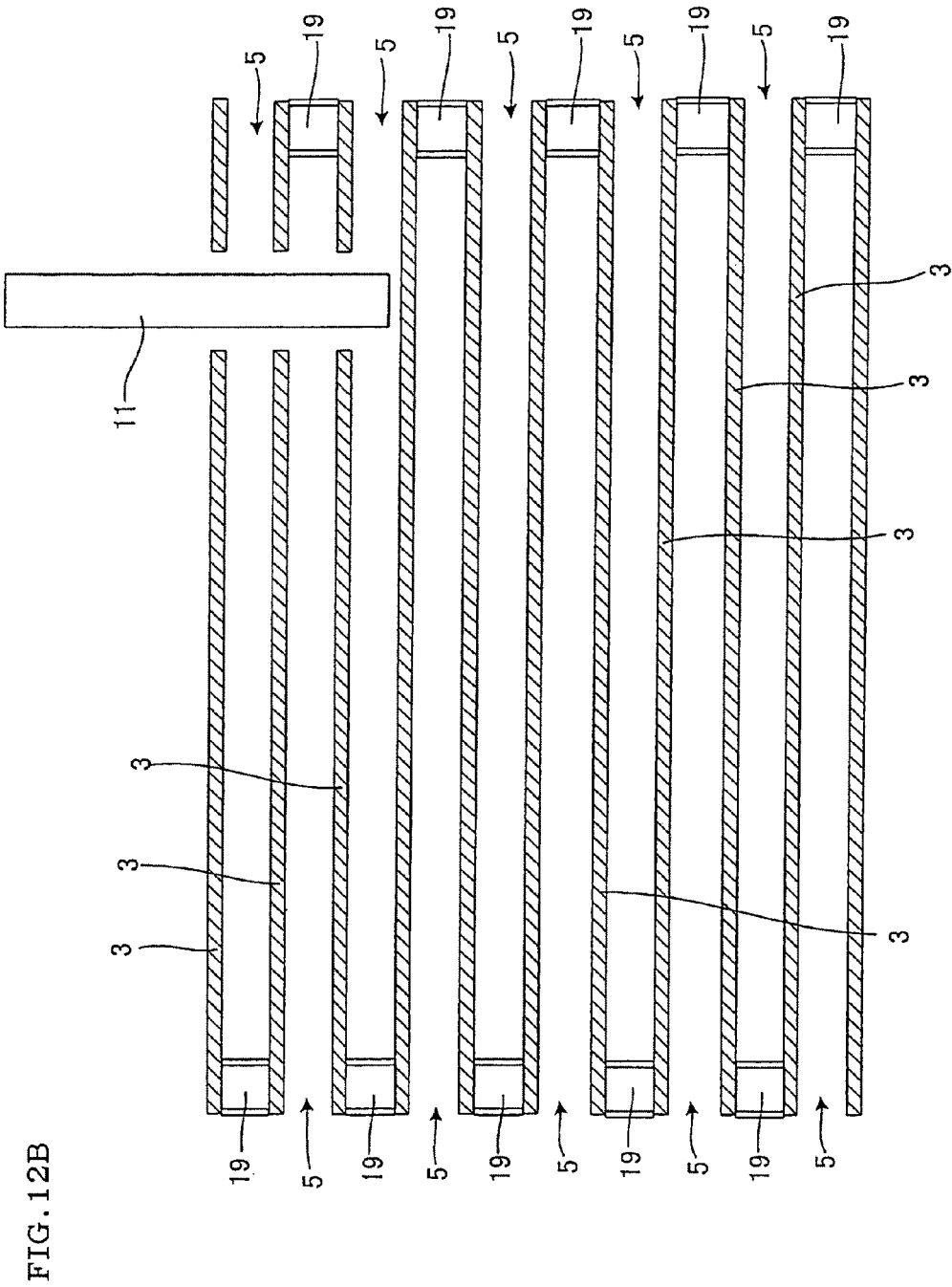
FIG. 12B is a view schematically illustrating the cross section of a part of a DPF of Comparative Example 2 and the state in which a sensor is attached.

As illustrated in FIG. 12B, a cordierite DPF of 0.305 mm (12 mil) wall thickness, 46.5 cells/cm$^2$ (300 cells/in$^2$), 143.8 mm (5.66 in) outside diameter×152.4 mm (6 in) (length), 52% porosity and 15 μm average pore diameter, the cordierite DPF was plugged in a checkerboard design at the end face on the gas inlet side and on the gas outlet side. A sensor hole of 8 mm inside diameter and 70 mm depth was formed from the side face 25 mm to the inlet side from this outlet side end face toward the center.

Comparative Example 3

As illustrated in FIG. 12C, a cordierite DPF of 0.305 mm (12 mil) wall thickness, 46.5 cells/cm$^2$ (300 cells/in$^2$), 143.8 mm (5.66 in) outside diameter×152.4 mm (6 in) (length), 52% porosity and 25 μm average pore diameter, the cordierite DPF was plugged in a checkerboard design at the end face on the gas inlet side and on the gas outlet side. A sensor hole of 3.3 mm inside diameter and 20 mm depth was formed in the central portion of the end face of plugging on this outlet side.

(Test 1)

Pressure drop measurement was made at room temperature. In specific, through the honeycomb structures equipped with a sensor of Example 1 and Comparative Example 1, air of 9 Nm$^3$/min was made to flow, and the difference in pressure thereof was measured. The reference of measurement evaluation is as follows. Results of pressure drop ratio with respect to the one without a sensor hole having been obtained in such a way are shown in Table 1. ○: within ±3%, x: not less than ±5%

(Test 2)

A catalyst was loaded on the DPF, soot regeneration test was conducted, and following characteristics of a temperature sensor that is mounted were confirmed. Regeneration conditions are that the accumulated amount of soot is 5 g/L, a regeneration gas temperature is 630 degrees centigrade, and an engine is decreased to idling on the way. Incidentally, the reference of confirmation and evaluation is as follows, and these results are shown in Table 1. ○: regeneration temperature peak can be detected, x: regeneration temperature peak cannot be detected.

(Test 3)

Vibration test was conducted at room temperature. In specific, the honeycomb structures equipped with a sensor of Example 1 and Comparative Example 1 were provided with the vibration of 100 Hz×100 Hr×30 G at room temperature to confirm the presence or the absence of breakage. The reference of confirmation and evaluation is as follows, and these results are shown in Table 1.

○○: good, ○: a little displacement, Δ: abrasion present, x: chipping breakage present (Test 4)

Figure 10:
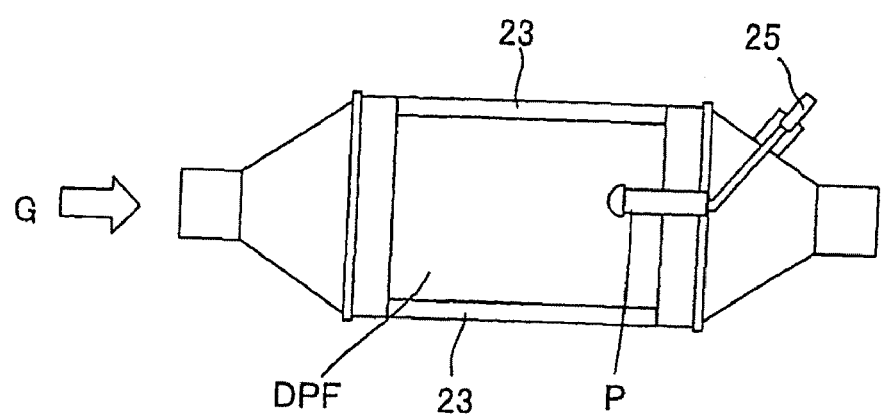
FIG. 10 is a schematic view illustrating the state in which a honeycomb structure with a sensor insertion hole to which an embodiment according to the present invention is applied is used as a DPF, and brought in canning via a mat.

Next, it was tested whether or not soot leakage occurs. Specifically, in an engine (2 L, pre-DOC is present), the DPFs of Example 2 and Comparative Example 2 of EU regulation mode (EUDC×3 times, thereafter measurement is made in NEDC mode) were placed under floor as is FIG. 10, and soot was accumulated until the volume of accumulated soot is 10 g/L, to make a test. Incidentally, as is illustrated in FIG. 10, the DPF is brought in canning in a metal case via a mat 23, and a thermocouple 25, being a sensor is attached. Setting was made so that the leading end of this thermocouple is positioned at a measurement point, and the temperature in the DPF was measured. The reference of measurement and evaluation is as follows. Results obtained in such a way are shown in Table 1.

○○: <1×10$^{11}$ numbers/km, ○: ≦6×10$^{11}$ numbers/km, Δ: >6×10$^{11}$ numbers/km, x: >6×10$^{12}$ numbers/km

TABLE 1

| arrangement | | Example 1 FIG. 11A | Example 2 FIG. 11B | Example 3 FIG. 11C | Example 4 FIG. 11D | Comparative Example 1 FIG. 12A | Comparative Example 2 FIG. 12B | Comparative Example 3 FIG. 12C |
|---|---|---|---|---|---|---|---|---|
| pressure drop | ○: within ±3% x: not less than +5% | ○ | ○ | ○ | ○ | x | x | ○ |
| regeneration temperature following characteristics | ○: regeneration temperature peak can be detected x: regeneration temperature peak cannot be detected | ○ | ○ | ○ | ○ | x | ○ | ○ |
| breakage (vibration) | ○○: good ○: a little displacement Δ: abrasion present x: chipping breakage | ○ | ○ (a little sleeve displacement present) | ○○ | ○○ | Δ (powder production) | Δ (powder production) | x (chipping and powder production) |
| soot leakage | ○○: <1 × $10^{11}$ numbers/km ○: <6 × $10^{11}$ numbers/km Δ: >6 × $10^{11}$ numbers/km x: >6 × $10^{12}$ numbers/km | ○ (5 × $10^{11}$ numbers/km) | ○ (4 × $10^{11}$ numbers/km) | ○ (2 × $10^{11}$ numbers/km) | ○○ (4 × $10^{10}$ numbers/km) | Δ (>6 × $10^{11}$ numbers/km) | x (severe leakage trace present) | x (severe leakage trace present) |

(Consideration 1)

As a result of Test 1, in the DPFs of Examples 1 to 4, there was observed no rise of a pressure drop as compared to the one without a sensor hole, and they were in good states. Whereas, in Comparative Examples 1 to 3, as compared to the one without a sensor hole, the rise of a pressure drop of 5% was observed.

Figure 13:
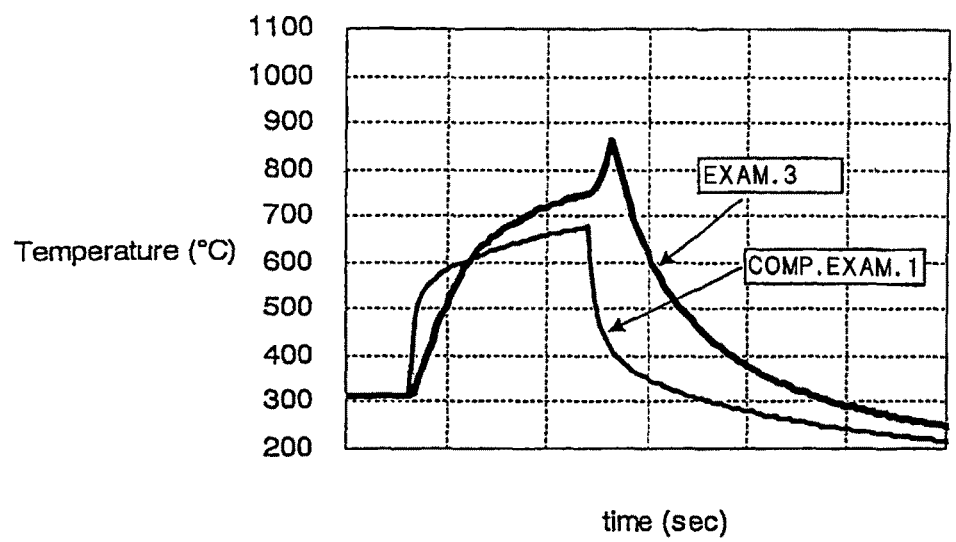
FIG. 13 is a graph schematically showing following characteristics of a regeneration temperature of the DPF of Example 3 to which another embodiment according to the present invention is applied and the DPF of Comparative Example 1.

As a result of Test 2, in the DPFs of Examples 1 to 4, good results of capable of measuring a regeneration temperature peak and confirming following characteristics of a temperature sensor could be obtained. For example, the DPF of Example 3, as illustrated in FIG. 13, exhibited a regeneration temperature peak and following characteristics of a temperature sensor. In addition, in Comparative Examples 2 and 3, following characteristics of a temperature sensor could be confirmed. In Comparative Example 1, however, a regeneration temperature peak could not be detected. This event is thought to result from that the sensor hole is resided forward of inlet plugging, so that little soot is accumulated forward of the sensor and no heat is generated at the time of regeneration; as well as since the heat to be generated on the occasion when soot is burned is escaped rearward in the flow of gas, the regeneration temperature peak cannot be detected using the sensor that is paced in the front. Incidentally, in the DPF of Comparative Example 1, following characteristics of a temperature sensor as is illustrated in FIG. 13 were shown.

As a result of Test 3, in the DPFs of Examples 1 to 4, good results could be obtained. In specific, in Examples 3 and 4, there was no breakage and in good states. In addition, in Examples 1 and 2, there was a little displacement; and further in Example 2, although a little sleeve displacement could be observed, it was not problematic at all for use as a DPF. Whereas, in Comparative Examples 1 and 2, there was observed the trace of abrasion could be observed, and specifically powder was produced. Furthermore, in Comparative Example 3, breakage was found. In specific, a rib (partition wall) and a thermocouple were brought in collision, chipping of the rib was generated, and a power (abrasion power) could be observed. From this result, the DPFs of Comparative Examples 1 to 3 were proved not to be usable as a DPF.

As a result of Test 4, in the DPFs of Examples 1 to 4, there was no soot leakage, and good results of PM number level could be obtained. In specific, in Example 1, it is not more than 5×$10^{11}$ numbers/km, in Example 2, it is not more than 4×$10^{11}$ numbers/km and in Example 3, it is not more than 2×$10^{11}$ numbers/km, respectively, and good results could be obtained. Especially, in Example 4, the best result of not more than 4×$10^{10}$ numbers/km could be obtained. Whereas, in Comparative Example 1, there was soot leakage, and a partial adhesion of black soot could be observed at the outlet face of the DPF. The PM number level exceeded 6×$10^{11}$ numbers/km, not to be usable as a DPF. In addition, in Comparative Examples 2 and 3, there was severe soot leakage, and the adhesion of black soot could be clearly observed at the outlet face of the DPF. Further, in Comparative Examples 2 and 3, the PM number level also exceeded 6×$10^{12}$ numbers/km, to be proved not to be usable as a DPF.

(Test 5)

Furthermore, the blocked amount with Ash accompanied by the repeated regeneration of a DPF filter was tested. In specific, the same DPF as the above-described Example 1 was preliminarily prepared, and a thermocouple was inserted in its sensor hole to make a measurement test of the blocked amount with Ash accompanied by the below-described DPF regeneration (hereinafter, properly it is referred to as "DPF of Example 5"). Measurement points of the blocked state using a thermocouple, as is illustrated in FIG. 17D, from the inlet side end face of an exhaust gas of the DPF to the outflow side end face of an exhaust gas, are T5 (at a point 170 mm from the outflow side end face of an exhaust gas), T6 (at a point 120 mm from the outflow side end face of an exhaust gas), T7 (at a point 70 mm from the outflow side end face of an exhaust gas), and T8 (at a point 20 mm from the outflow side end face of an exhaust gas). In addition, an SiCDPF of 0.305 mm (12 mil) wall thickness, 46.5 cells/cm² (300 cells/in²), 143.8 mm (5.66 in) outside diameter×152.4 mm (6 in) (length), 52% porosity and 15 μm average pore diameter, the SiCDPF was disposed in a checkerboard design at the gas inlet side end face and at the outlet side end face. Further, a thermocouple of diameter φ0.5 mm was inserted in its one cell, to make the below-mentioned measurement test as is the above-described Example 1 (hereinafter, it is properly referred to as "DPF of Comparative Example 4").

The DPFs of Example 5 and Comparative Example 4 were installed respectively on a diesel engine of 2.0 L, and soot was accumulated in the steady state of 3000 rpm×50 Nm. Thereafter, by post injection, the gas temperature at the DPF inlet was controlled to be 620 degrees centigrade at 1700 rpm×95 Nm, in a stage in which the pressure drop of each DPF was detected, post-off was made at idling, and 200 cycles of regeneration cycle was repeated. Results having been obtained in such a way are shown in the graph of FIG. 16.

(Consideration 2)

Figure 16:
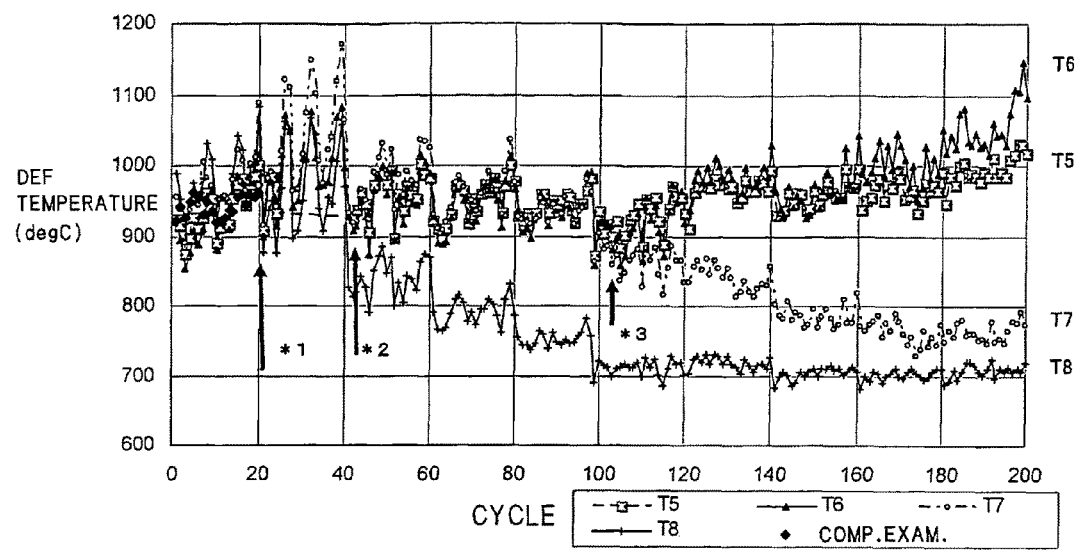
FIG. 16 is a graph illustrating results of a blocked amount with Ash accompanied by the regeneration of a DPF filter.

As is illustrated in FIG. 16, in the DPF of Example 5, after a predetermined number of regeneration cycles, in order from the place near to the honeycomb end face side, the state in which the temperature to be detected by a sensor does not rise was observed, and the state in which cells are blocked with Ash could be detected. In specific, as is illustrated in FIG. 16, after 40 cycles of regeneration, at T8, due to the fact that the temperature to be detected by a sensor does not rise (refer to *2 of FIG. 16), it was found to be blocked with Ash. At T7, due to the fact that the temperature to be detected by a sensor does not rise, the blockage with Ash could be confirmed (refer to *3 of FIG. 16). In particular, at T7, due to the blockage with Ash, the temperature at the time of regeneration could be confirmed not to rise to 900 degrees centigrade or more. On the other hand, in Comparative Example 4, breakage occurred at 20 cycles. Consequently, as is Comparative Example 4, when a sensor is set directly in the cells, the sensor was damaged when in use and thus disconnected. In addition, the honeycomb partition wall is thin and the cells are too small, so that the sensor could not be inserted without damages of the cells, thus applying damages to the DPF. With the arrangement, poor usefulness was evidenced.

Figure 17A:
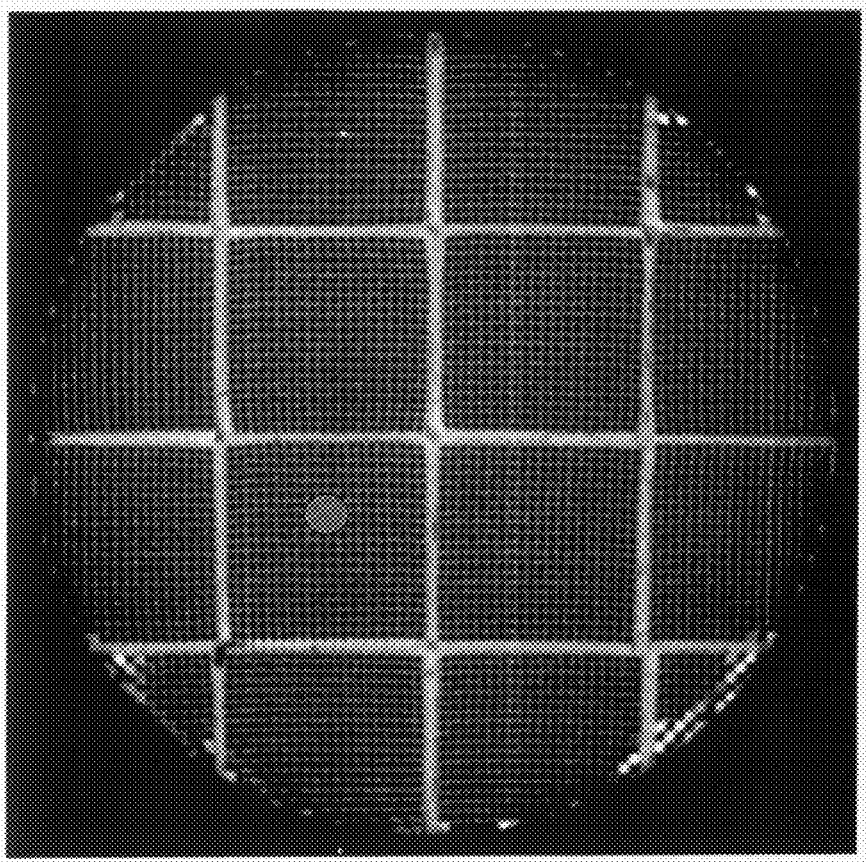
FIG. 17A is a photograph illustrating a region 150 mm from the outflow side end face of an exhaust gas of the DPF of Example 1, being the cross section perpendicular to the length direction of the DPF.
Figure 17B:
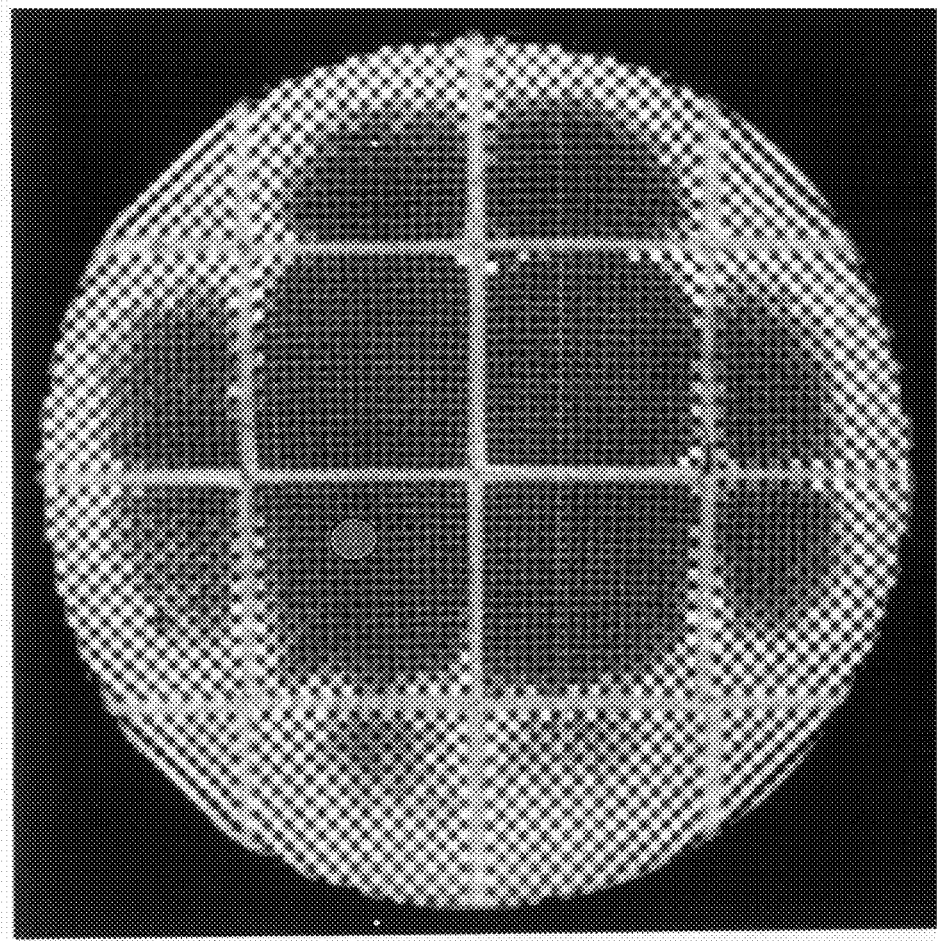
FIG. 17B is a photograph illustrating a region 120 mm from the outflow side end face of an exhaust gas of the DPF of Example 1, being the cross section perpendicular to the length direction of the DPF.
Figure 17C:
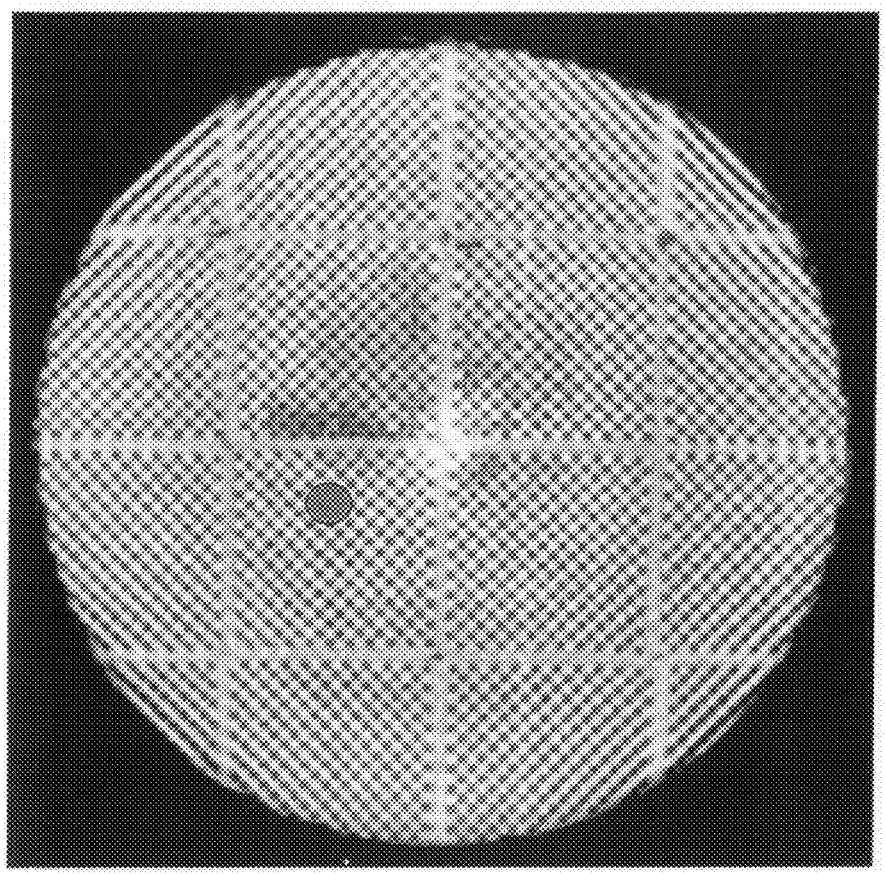
FIG. 17C is a photograph illustrating a region 100 mm from the outflow side end face of an exhaust gas of the DPF of Example 1, being the cross section perpendicular to the length direction of the DPF.

Incidentally, shown are photographs illustrated in FIGS. 17A to 17D further evidencing the above-described tests. FIG. 17D illustrates the state in which Ash is accumulated and cells are blocked in the DPF of Example 1, and illustrates the cross section in the length direction of the DPF after 200 cycles of regeneration tests have been repeated. As is obvious from this FIG. 17D, it was observed that Ash is accumulated and the cells are blocked from the outflow side end face of an exhaust gas of the honeycomb to the mid-stream region of the honeycomb. Likewise, FIG. 17A illustrates the region 150 mm from the outflow side end face of an exhaust gas of the honeycomb, being the cross section perpendicular to the length direction of the DPF. FIG. 17B illustrates the region 120 mm from the outflow side end face of an exhaust gas of the honeycomb, being the cross section perpendicular to the length direction of the DPF. FIG. 17C illustrates the region 100 mm from the outflow side end face of and exhaust gas of the honeycomb, being the cross section perpendicular to the length direction of the DPF. With the arrangement, the blockage of the cells with Ash from the outflow side end face of an exhaust gas of the honeycomb toward the mid-stream region (the inflow side end face of an exhaust gas of the honeycomb) can be confirmed, and the graph shown in the above-described FIG. 16 is evidenced. That is, in the region not more than 110 mm from the outflow side end face of an exhaust gas of the honeycomb, it can be confirmed that all the cells are blocked with Ash, and do not function as a filter. In the region between 110 mm and not more than 150 mm from the outflow side end face of an exhaust gas of the honeycomb, an outer peripheral portion can be confirmed to be blocked with Ash. In the region between 110 mm and not more than 150 mm from the outflow side end face of an exhaust gas of the honeycomb, little Ash can be confirmed to be accumulated. Thus, these confirmations are coincident with detection results of a sensor shown by the graph of the above-described FIG. 16. Consequently, according to this embodiment, it was proved to be able to easily detect the blocked amount in cells without the provision of damages to the honeycomb. Incidentally, in FIGS. 17A to 17D, in the photographs, a sensor insertion hole is not clear, so that the insertion hole was clearly shown from above.

The honeycomb structure with a sensor insertion hole according to the present invention can preferably be used in a filter provided with a catalyst for an exhaust gas, a diesel engine, an engine for an automobile, a truck or a bus, or in exhaust gas processing of a combustion apparatus.

What is claimed is:

1. A honeycomb structure comprising:
    a porous partition wall configured to divide the honeycomb structure;
    a plurality of cells formed by the partition wall and configured to act as a through channel for a fluid;
    an insertion hole configured to accept insertion of a sensor, the insertion hole formed in an end face of the honeycomb structure, the insertion hole occupying at least a part of a shape defined by the end face of the honeycomb structure and a cut portion of the partition wall; and
    a breakage prevention means only on an inner circumference or in a proximity of the insertion hole.

2. The honeycomb structure according to claim 1, wherein the insertion hole is formed in a length direction of the honeycomb structure.

3. The honeycomb structure according to claim 1, wherein the insertion hole is formed in a region extending within a plurality of cells.

4. The honeycomb structure according to claim 1, wherein the insertion hole is formed on the end face corresponding to an outlet side of a fluid.

5. The honeycomb structure according to claim 4, wherein a wall reinforcing member is further applied or injected as the breakage prevention means.

6. The honeycomb structure according to claim 5, wherein a same material as an outer peripheral coat member or a plugging member is further injected as the breakage prevention means.

7. The honeycomb structure according to claim 1, wherein the breakage prevention means is a sleeve.

8. The honeycomb structure according to claim 5, wherein the insertion hole includes a space at a measurement portion or a low-heat capacity portion.

9. The honeycomb structure according to claim 1, wherein the honeycomb structure is composed of a ceramic material and has an average pore diameter of 1 μm to 20 μM.

10. The honeycomb structure according to claim 1, wherein the partition wall is constructed to be a multi-layer structure including:
    a porous partition wall base member; and
    at least one layer of a surface layer that is provided only on an inflow side or both on an inflow side and on an outflow side of the fluid at the partition wall base member.

11. The honeycomb structure according to claim 1, wherein, when the sum total of areas in a cross section perpendicular to a longitudinal direction of predetermined cells whose one end portion is plugged is A (mm$^2$) and the sum total of areas in a cross section perpendicular to a longitudinal direction of remaining cells whose other end portion is plugged is B (mm$^2$), the sum total of areas are in a relationship of A<B.

12. The honeycomb structure according to claim 1, wherein a cross sectional shape perpendicular with respect to a longitudinal direction of predetermined cells whose one end portion is plugged and a cross sectional shape perpendicular with respect to a longitudinal direction of remaining cells whose other end portion is plugged are different.

13. The honeycomb structure according to claim 1, wherein the sensor is configured to detect a blocked state of the cell.

14. A honeycomb filter comprising the honeycomb structure of claim 1, wherein cells, which are unplugged at an end face on an opposite side to the end face at which the insertion hole is formed and formed in a same channel as a cell proximate to an outer circumference of the insertion hole, are additionally plugged.

15. A converter comprising the honeycomb filter according to claim 14, wherein the honeycomb filter is subjected to canning, and the sensor is inserted into the insertion hole of the honeycomb structure.

16. A method of detecting a blocked amount of the cell in the honeycomb structure according to claim 1 via the sensor.

17. The honeycomb structure according to claim 1, wherein the insertion hole has a depth of 10 mm to 100 mm from an outlet side end face and a diameter of Φ0.2 mm to Φ21 mm.

* * * * *